United States Patent
Machida

(10) Patent No.: US 9,203,737 B2
(45) Date of Patent: Dec. 1, 2015

(54) BASE STATION, CONTROL METHOD, AND COMMUNICATION SYSTEM

(71) Applicant: FUJITSU LIMITED, Kawasaki-shi, Kanagawa (JP)

(72) Inventor: Mamoru Machida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/181,795

(22) Filed: Feb. 17, 2014

(65) Prior Publication Data

US 2014/0293789 A1   Oct. 2, 2014

(30) Foreign Application Priority Data

Mar. 29, 2013   (JP) ................................. 2013-075146

(51) Int. Cl.
*H04W 4/00*       (2009.01)
*H04L 12/727*     (2013.01)
*H04W 40/12*      (2009.01)

(52) U.S. Cl.
CPC ............. *H04L 45/121* (2013.01); *H04W 40/12* (2013.01)

(58) Field of Classification Search
CPC ......... H04L 65/00; H04L 45/00; H04L 45/02; H04L 45/04; H04L 45/121; H04W 36/30; H04W 36/24; H04W 40/12

USPC ........... 370/238, 237, 236.2, 241.1, 248, 252, 370/332, 348

See application file for complete search history.

(56) References Cited

U.S. PATENT DOCUMENTS

| | | | |
|---|---|---|---|
| 6,687,501 B2* | 2/2004 | Soliman ..................... | 455/424 |
| 6,785,257 B1* | 8/2004 | Miyatani ..................... | 370/342 |
| 2009/0180451 A1* | 7/2009 | Alpert et al. ................ | 370/338 |
| 2011/0069638 A1 | 3/2011 | Ishizu et al. | |
| 2011/0267970 A1* | 11/2011 | Okamoto et al. ............ | 370/252 |
| 2013/0083661 A1* | 4/2013 | Gupta et al. ................. | 370/235 |
| 2013/0121182 A1* | 5/2013 | Hegge ......................... | 370/252 |
| 2014/0010097 A1* | 1/2014 | Yokoyama .................. | 370/252 |

FOREIGN PATENT DOCUMENTS

| | | |
|---|---|---|
| JP | 2011-71625 A | 4/2011 |
| JP | 2012-15725 A | 1/2012 |

* cited by examiner

*Primary Examiner* — Brenda H Pham
(74) *Attorney, Agent, or Firm* — Fujitsu Patent Center

(57) ABSTRACT

A base station includes a communicating unit that relays communication between a network and a mobile terminal that is capable of using plural communication schemes that respectively use differing transmission routes to a network; a measuring unit that measures a delay amount in the transmission route of each of the communication schemes; and a switching unit that among the communication schemes and based on predetermined information that includes the measured delay amount, switches the communication scheme used for relaying the communication.

14 Claims, 22 Drawing Sheets

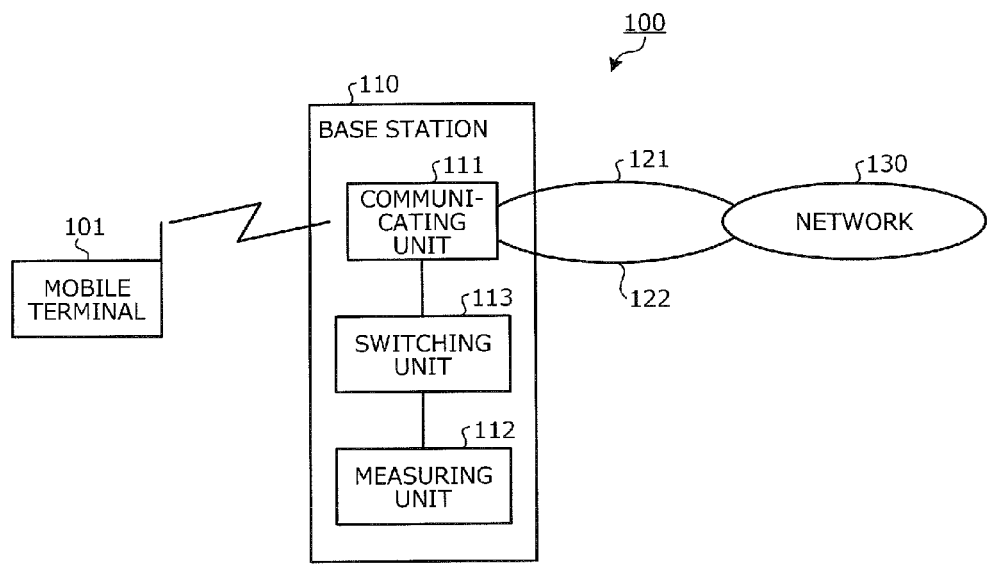
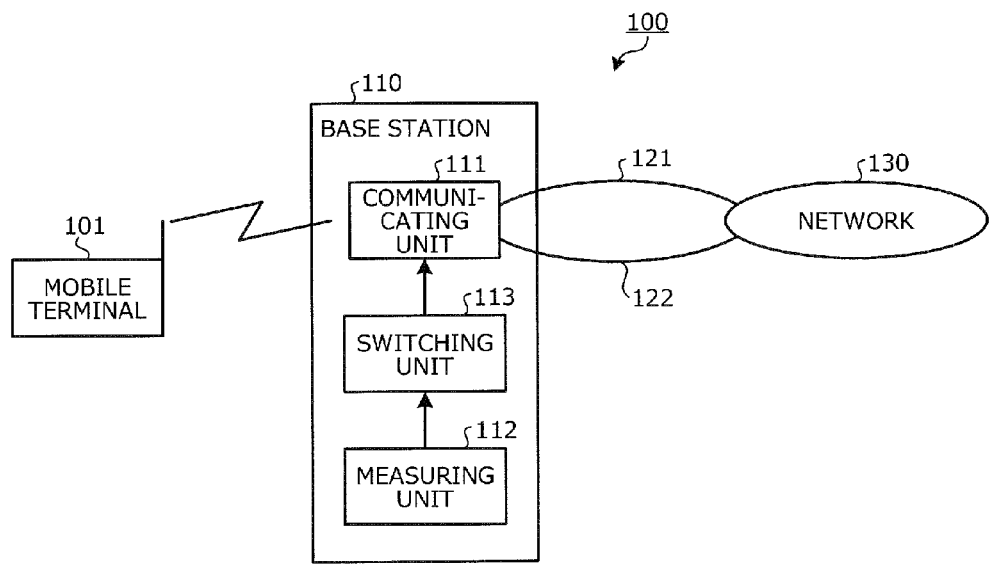

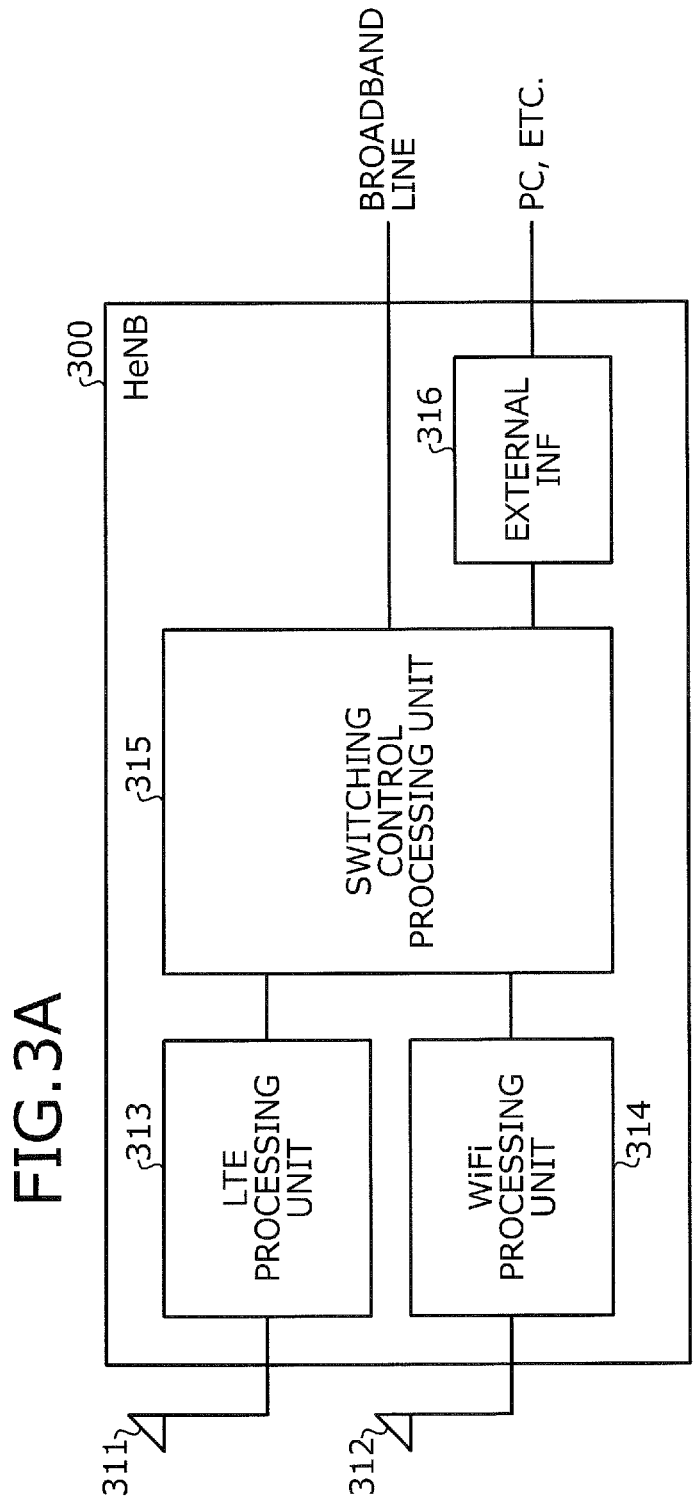

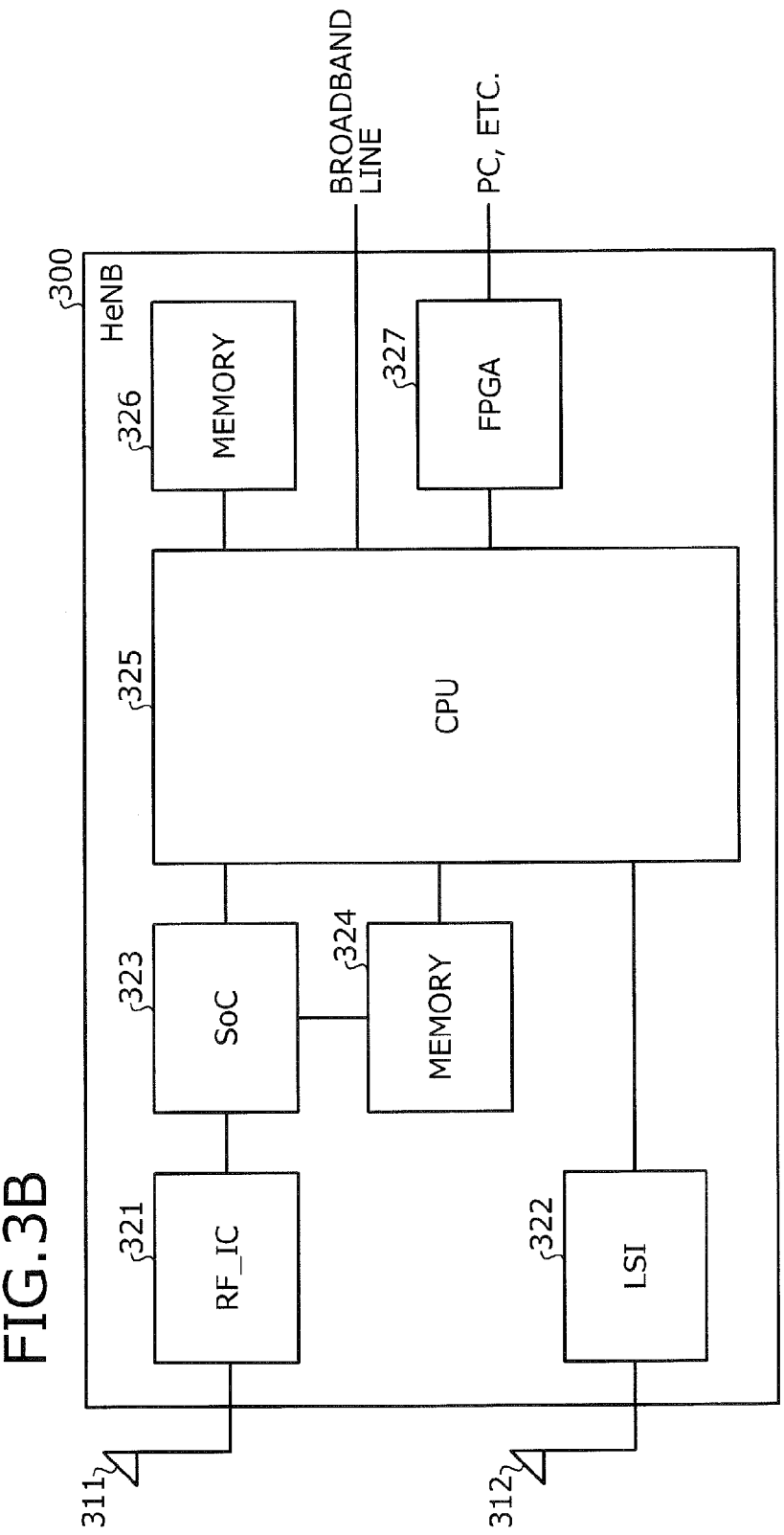

| ITEM | ITEM FOR SELECTION | COMMUNICATION SCHEME | | REMARKS |
|---|---|---|---|---|
| | | LTE | WiFi | |
| 1 | SERVICE 1 (DATA TRANSFER) | ○ | | |
| 2 | SERVICE 2 (MAIL SERVICE) | ○ | | SPECIFIC TO CARRIER |
| 3 | SERVICE 3 (MAIL SERVICE) | | ○ | PROVIDER CONTRACT |
| 4 | SERVICE 4 (VoLTE) | ○ | | |
| 5 | SERVICE 5 (PRIORITY CALL) | ○ | | |
| 6 | RADIO PROPAGATION STATE 1 (LTE: FAVORABLE, WiFi: FAVORABLE) | | ○ | |
| 7 | RADIO PROPAGATION STATE 2 (LTE: FAVORABLE, WiFi: POOR) | ○ | | |
| 8 | RADIO PROPAGATION STATE 3 (LTE: POOR, WiFi: FAVORABLE) | | ○ | |
| 9 | RADIO PROPAGATION STATE 4 (LTE: POOR, WiFi: POOR) | ○ | | |
| 10 | DATA AMOUNT 1 (LARGE) | ○ | | |
| 11 | DATA AMOUNT 2 (INTERMEDIATE) | | ○ | |
| 12 | DATA AMOUNT 3 (SMALL) | | ○ | |
| 13 | NW QUALITY (DELAY) 1 (MOBILE : LARGE, PROVIDER : LARGE) | | ○ | |
| 14 | NW QUALITY (DELAY) 2 (MOBILE : SMALL, PROVIDER : LARGE) | ○ | | |
| 15 | NW QUALITY (DELAY) 3 (MOBILE : LARGE, PROVIDER : SMALL) | | ○ | |
| 16 | NW QUALITY (DELAY) 4 (MOBILE : SMALL, PROVIDER : SMALL) | ○ | | |
| 17 | RATE PLAN 1 (MOBILE : METER RATE BILLING, PROVIDER : METER RATE BILLING) | | ○ | |
| 18 | RATE PLAN 2 (MOBILE : FLAT RATE SYSTEM, PROVIDER : METER RATE BILLING) | ○ | | |
| 19 | RATE PLAN 3 (MOBILE : METER RATE BILLING, PROVIDER : FLAT RATE SYSTEM) | | ○ | |
| 20 | RATE PLAN 4 (MOBILE : FLAT RATE SYSTEM, PROVIDER : FLAT RATE SYSTEM) | ○ | | |

| ITEM | ITEM GROUP FOR SELECTION | PRIORITY RANK |
|---|---|---|
| 1 | SERVICE (OTHER THAN PRIORITY CALL) | 5 |
| 2 | SERVICE (PRIORITY CALL) | 1 |
| 3 | RADIO PROPAGATION STATE | 3 |
| 4 | DATA AMOUNT | 6 |
| 5 | NW QUALITY (DELAY) | 4 |
| 6 | RATE PLAN | 2 |

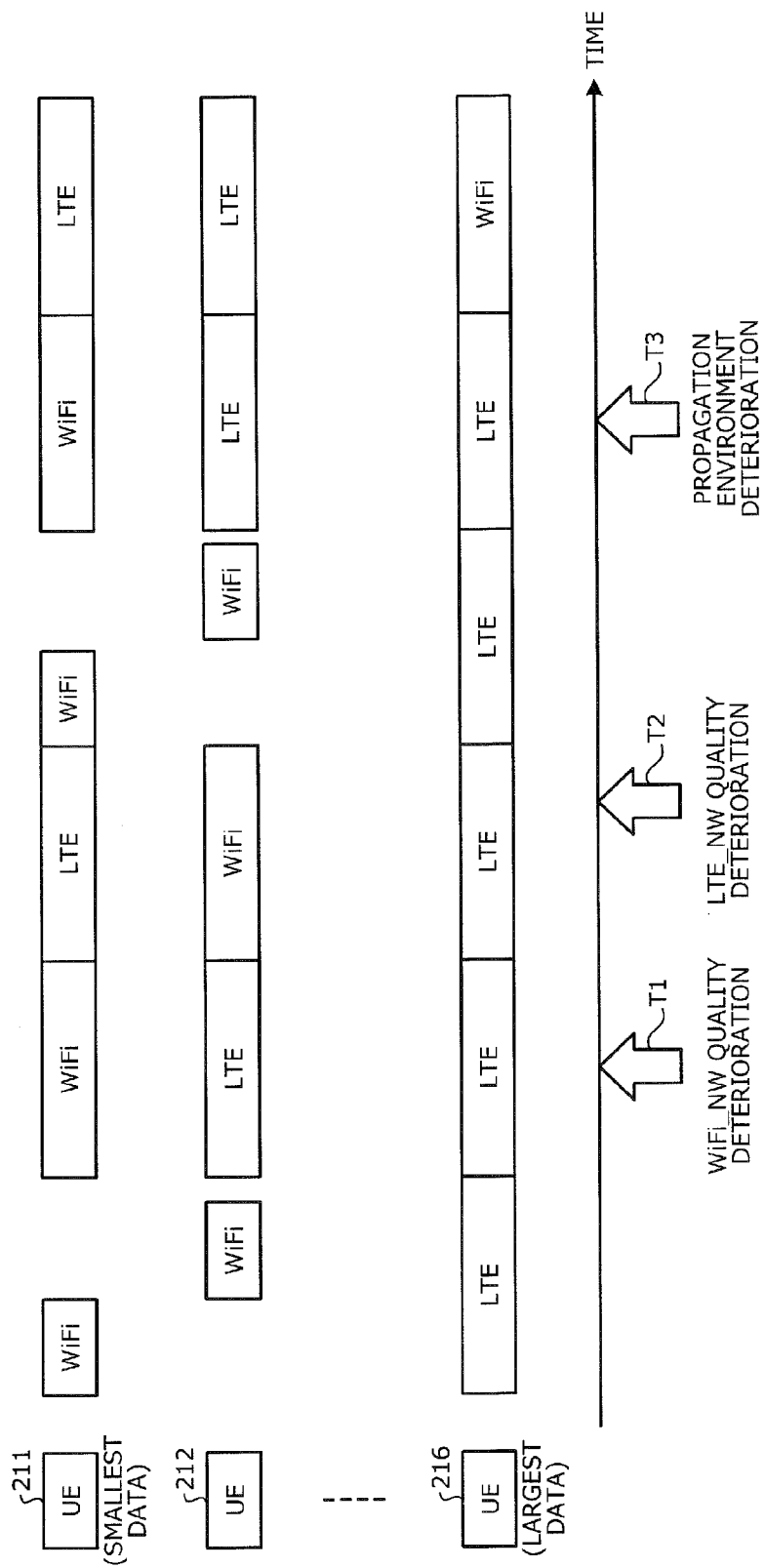

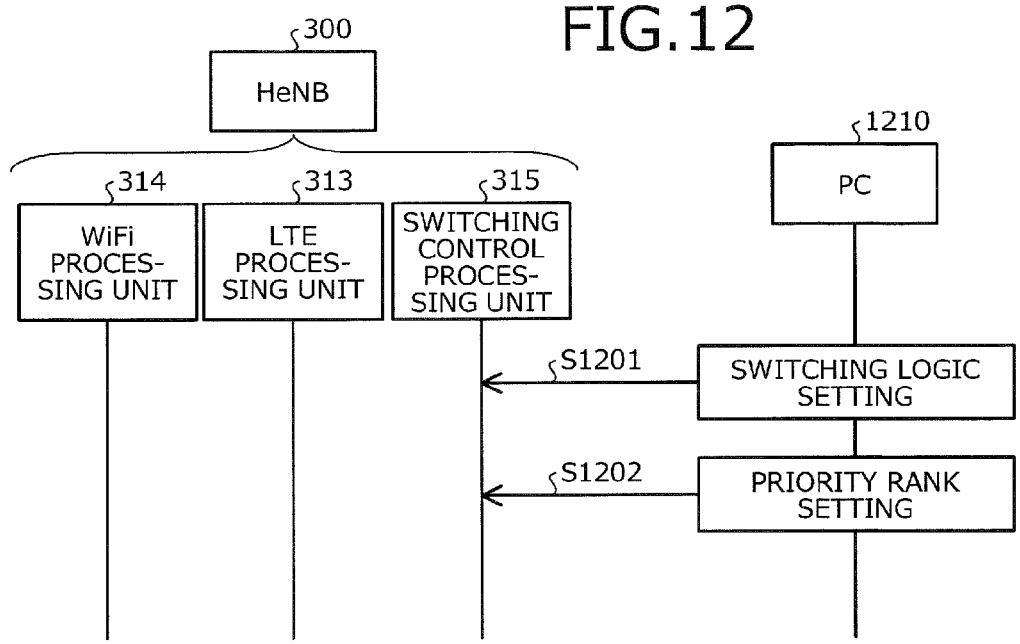

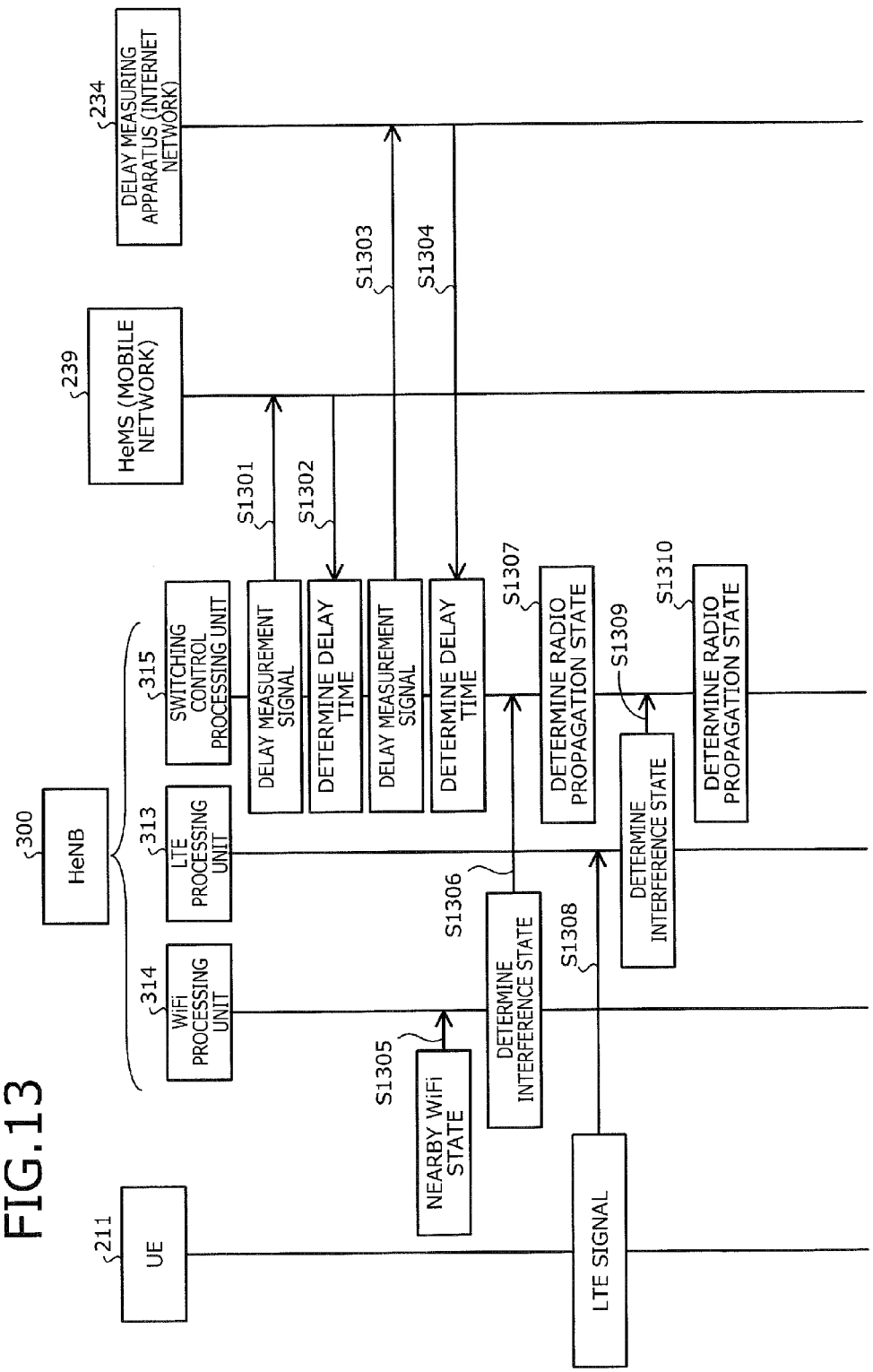

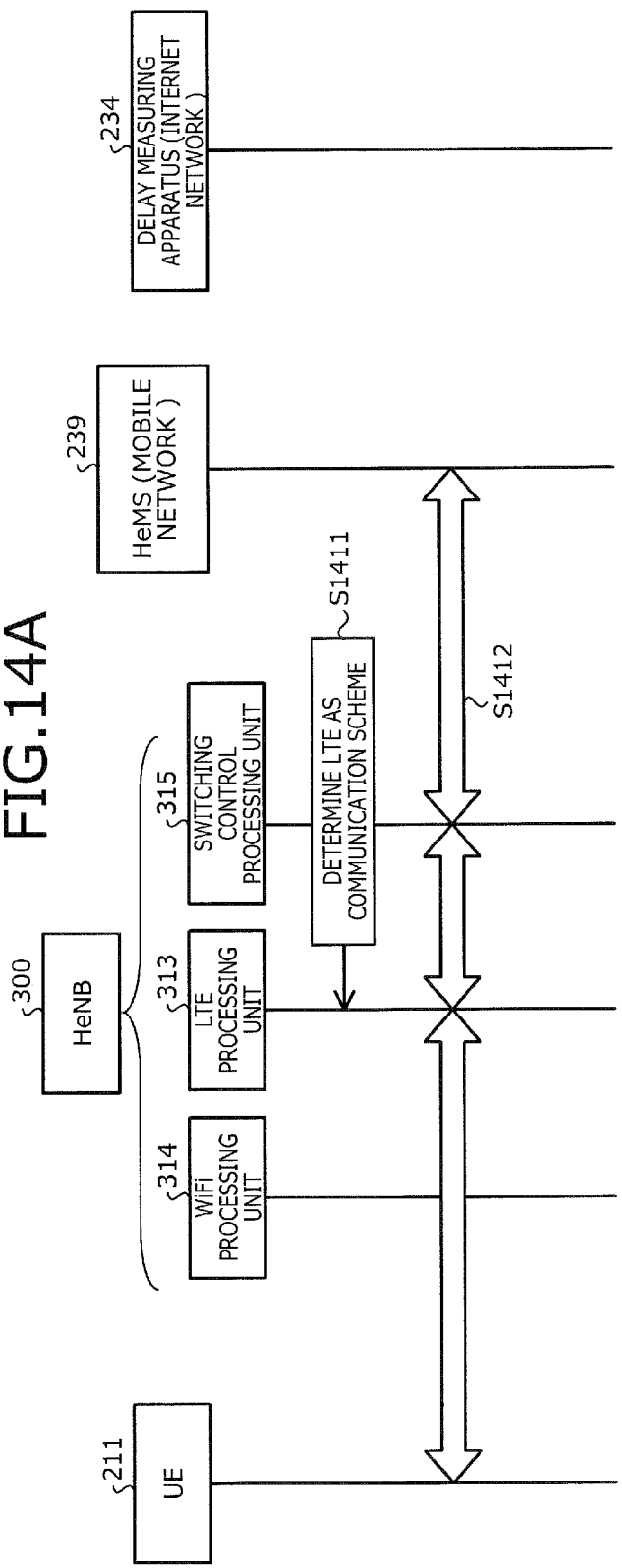

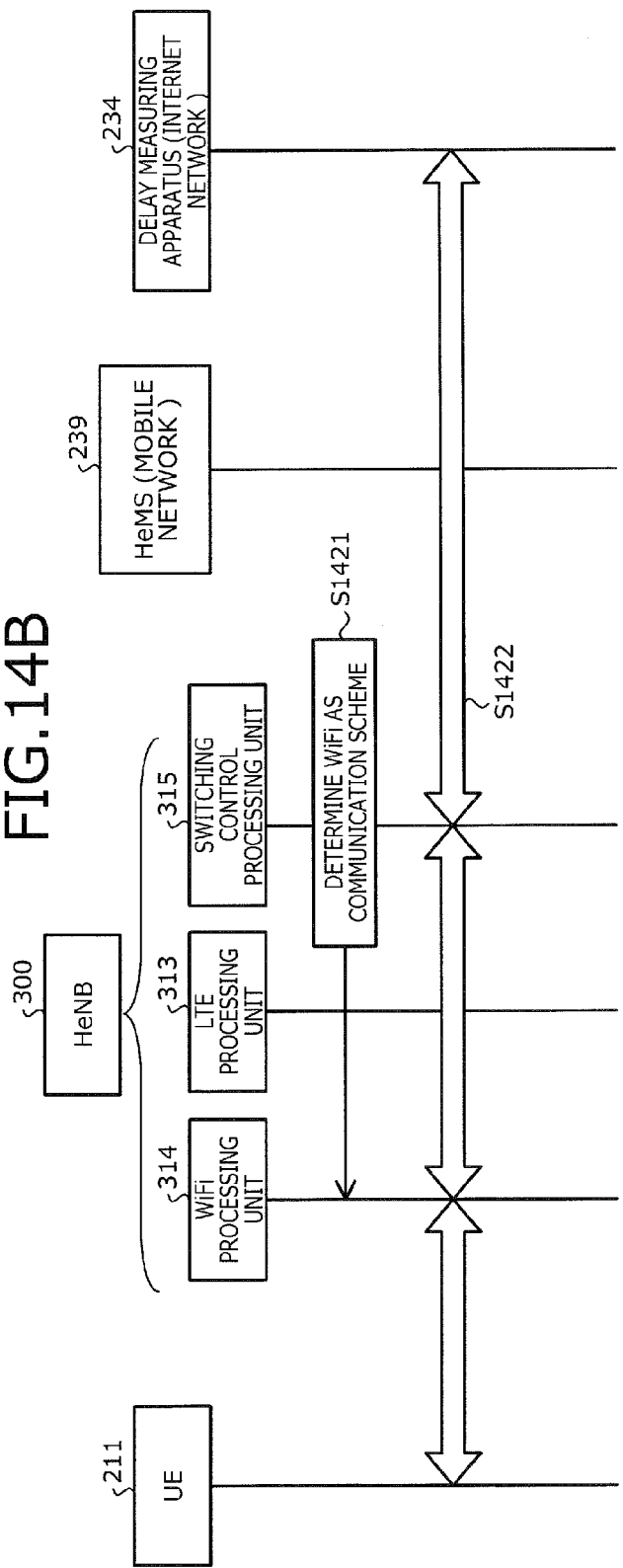

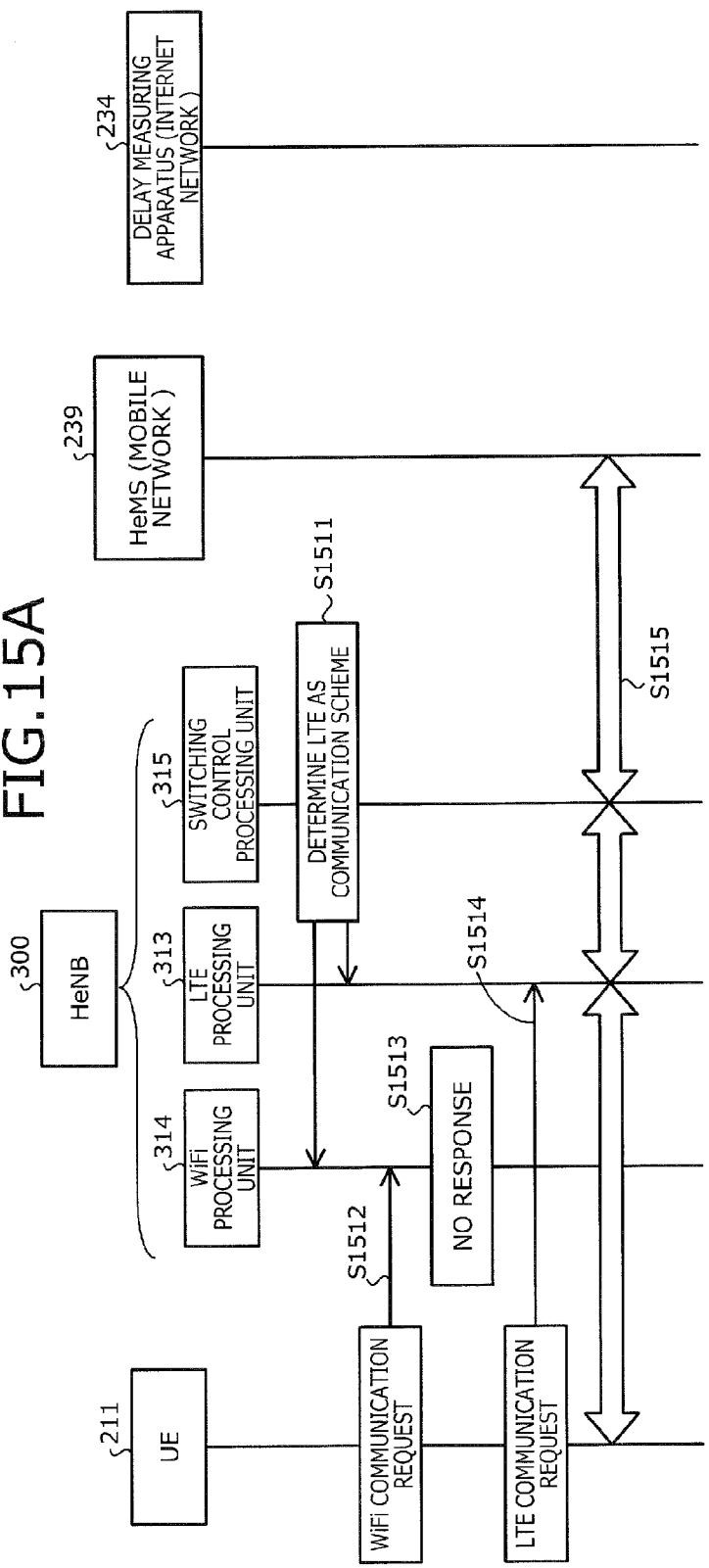

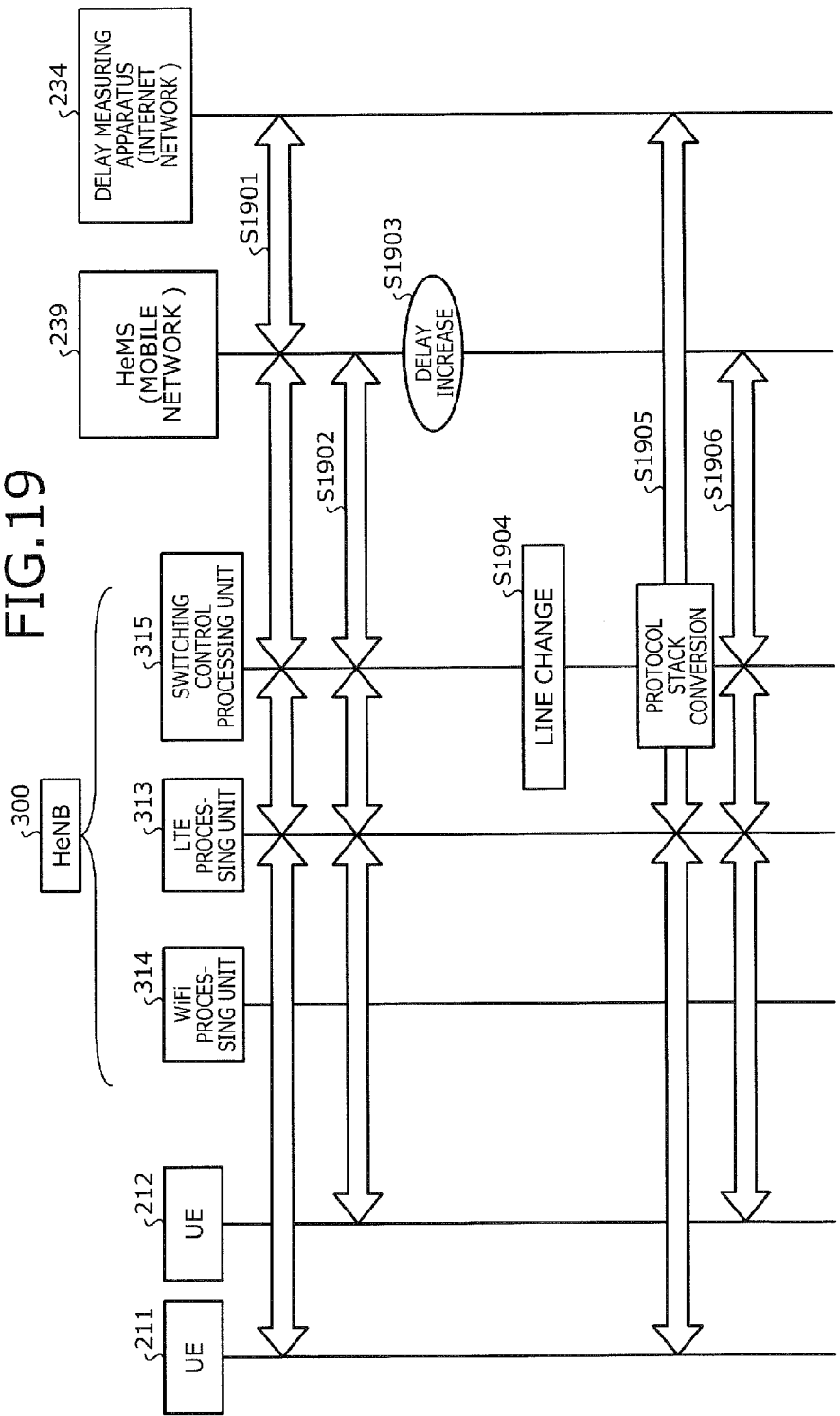

BASE STATION, CONTROL METHOD, AND COMMUNICATION SYSTEM

CROSS REFERENCE TO RELATED APPLICATIONS

This application is based upon and claims the benefit of priority of the prior Japanese Patent Application No. 2013-075146, filed on Mar. 29, 2013, the entire contents of which are incorporated herein by reference.

FIELD

The embodiments discussed herein are related to a base station, a control method, and a communication system.

BACKGROUND

A conventionally known technique executes radio communication using a base station selected from plural base stations, by a higher-order apparatus of the base station (see e.g., Japanese Laid-Open Patent Publication Nos. 2012-15725 and 2011-71625). A home eNodeB (HeNB: femto base station) is known that is a small-size base station for portable terminals and that is installed in a home, etc. According to another technique, a HeNB supports plural communication schemes; an end user using a user terminal can voluntarily select a communication scheme; and the user terminal automatically selects a communication scheme according to the radio propagation state.

Nonetheless, according to the conventional techniques, for example, even when the user terminal selects a communication scheme according to the radio propagation state, the transmission route may be congested on the network side employing the selected communication scheme. Therefore, a problem arises in that improvement of the communication efficiency is difficult.

SUMMARY

According to an aspect of an embodiment, a base station includes a communicating unit that relays communication between a network and a mobile terminal that is capable of using plural communication schemes that respectively use differing transmission routes to a network; a measuring unit that measures a delay amount in the transmission route of each of the communication schemes; and a switching unit that among the communication schemes and based on predetermined information that includes the measured delay amount, switches the communication scheme used for relaying the communication.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1A is a diagram of an example of a communication system according to an embodiment;
FIG. 1B is a diagram of an example of signal flow in the communication system depicted in FIG. 1A;
FIG. 3A is a diagram of an example of a configuration of a HeNB;
FIG. 3B is a diagram of an example of a circuit configuration of the HeNB depicted in FIG. 3A;
FIG. 8 is a diagram of an example of a selection condition table for a communication scheme;
FIG. 9 is a diagram of an example of priority rank information;
FIG. 11 is a diagram of an example of switching of the communication scheme of each of the UEs;
FIG. 12 is a sequence diagram of an example of a setting operation of the HeNB in the communication system;
FIG. 13 is a sequence diagram of an example of an acquisition process for network quality of and a radio propagation state in the communication system;
FIG. 14A is a sequence diagram (Part I) of an example of an operation 1 executed for communication in the communication system;
FIG. 14B is a sequence diagram (Part II) of the example of the operation 1 executed for communication in the communication system;
FIG. 15A is a sequence diagram (Part I) of an example of an operation 2 executed for communication in the communication system;
FIG. 19 is a sequence diagram of an example of an operation 4 executed for communication in the communication system.

DESCRIPTION OF EMBODIMENTS

Figure 2:
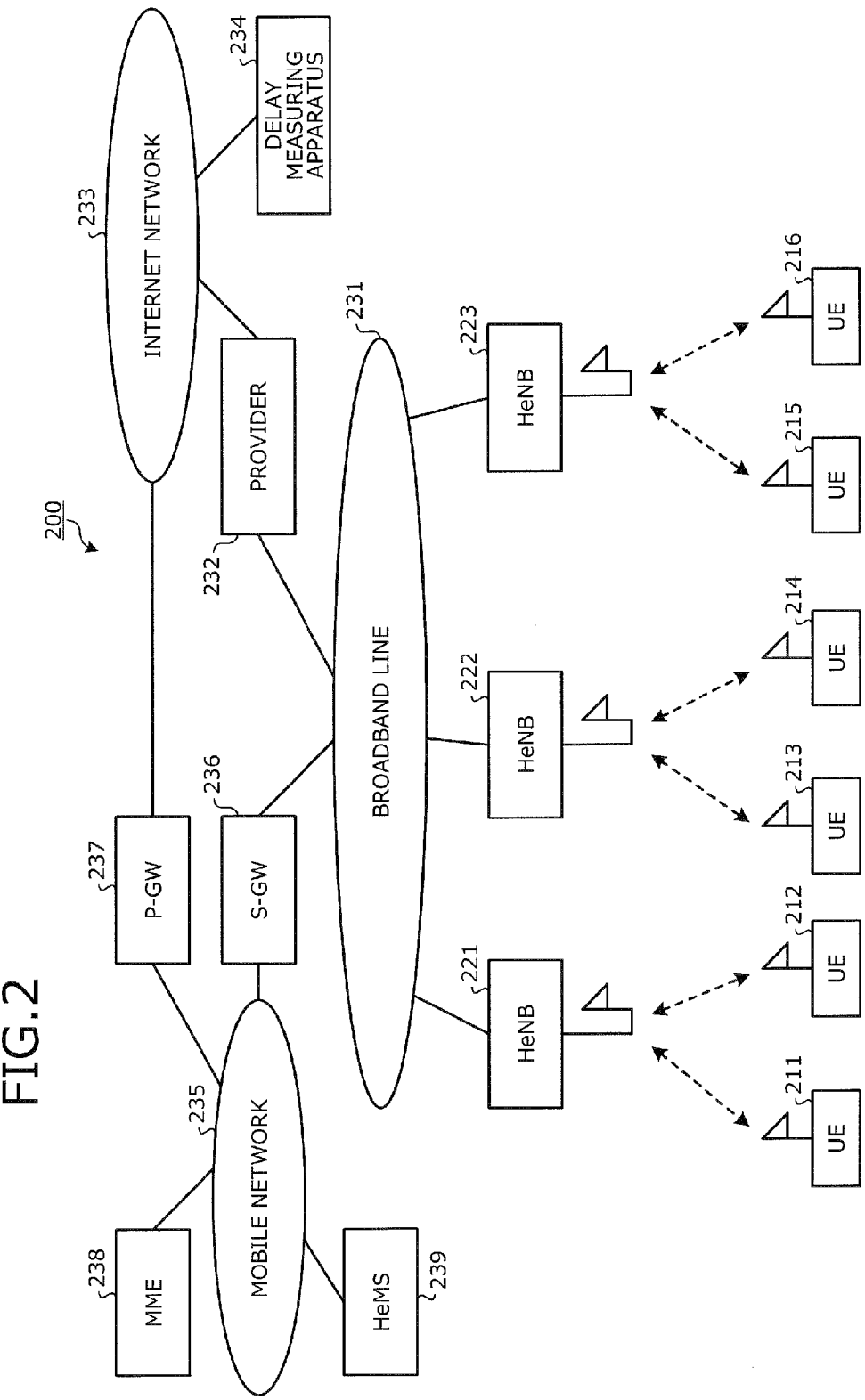
FIG. 2 is a diagram of a specific example of the communication system.

Embodiments of a base station, a control method, and a communication system will be described in detail with reference to the accompanying drawings.

FIG. 1A is a diagram of an example of a communication system according to an embodiment. FIG. 1B is a diagram of an example of signal flow in the communication system depicted in FIG. 1A. As depicted in FIGS. 1A and 1B, the communication system 100 according to the embodiment includes a mobile terminal 101 and a base station 110. The mobile terminal 101 executes radio communication with the base station 110, and executes communication with a network 130, the communication being relayed by the base station 110. For example, the Internet network can be an example of the network 130. Plural mobile terminals 101 may be present.

The mobile terminal 101 can use plural communication schemes by switching thereamong. The plural communication schemes each use, for example, a different transmission route to the network 130. For example, it is assumed that the mobile terminal 101 can use a first communication scheme whose transmission route from the base station 110 to the network 130 is a first transmission route 121, and a second communication scheme whose transmission route from the base station 110 to the network 130 is a second transmission route 122.

For example, among the first and the second communication schemes, one of the schemes may be a 3rd generation (3G) (the third generation mobile communication system) or a long term evolution (LTE) scheme of connecting to the Internet network through a mobile communication network. Meanwhile, among the first and the second communications schemes, the other scheme may be scheme of connecting a wireless local area network (WLAN) such as wireless fidelity (WiFi) to the Internet network through no mobile communication network. "WiFi" is a registered trademark.

The base station 110 includes a communicating unit 111, a measuring unit 112, and a switching unit 113. The communicating unit 111 executes radio communication with the mobile terminal 101, also executes communication with the network 130 and thereby, relays communication between the mobile terminal 101 and the network 130. The communication between the base station 110 and the network 130 is, for example, radio communication.

The measuring unit 112 measures a delay amount in each of the first and the second transmission routes 121 and 122. For example, the measuring unit 112 transmits a measurement signal to each of the first and the second transmission routes 121 and 122, receives a response signal to the transmitted measurement signal, and thereby, measures the delay amount in each of the first and the second transmission routes 121 and 122. For example, the measuring unit 112 periodically executes the measurement of the delay amount in each of the first and the second transmission routes 121 and 122, and outputs the measurement result of the delay amount to the switching unit 113.

The switching unit 113 switches among the plural communication schemes, the communication scheme to be used for the communication between the mobile terminal 101 and the network 130, based on predetermined information including the measurement result output from the measuring unit 112.

Thus, communication between the mobile terminal 101 and the network 130 is enabled based on a communication scheme whose delay amount of the network is as small as possible, at the control of the base station 110, which capable of measuring the state of the delay in the network. Therefore, the delay of the communication can be reduced between the mobile terminal 101 and the network 130, and distribution of the traffic of the network can be facilitated. Therefore, improvement of the communication efficiency can be facilitated.

When the switching of the communication scheme is executed at the control of the mobile terminal, the mobile terminal can acquire no information such as the state of the network and therefore, can not facilitate any improvement of the communication efficiency. On the contrary, the base station 110 can select the communication scheme whose delay amount of the network is as small as possible and can facilitate the improvement of the communication efficiency at the initiative of the base station 110 capable of measuring the state of the delay in the network.

For example, when the plural mobile stations 101 each use a mobile communication network that is different from each other, the measurement result of the state of the delay in the network may be a value specific to each of the mobile terminals 101. Therefore, uneven use of the communication schemes by the plural mobile terminals 101 can be suppressed and improvement of the communication quality can be facilitated.

If the mobile terminals each selects a communication scheme corresponding to the radio propagation state, the radio propagation states are same for the mobile terminals located at positions close to each other and therefore, the mobile terminals may select the same communication scheme and the loads may become concentrated. On the contrary, according to the base station 110, the communication scheme is selected based on the predetermined information that may be a value specific to each of the mobile terminals 101 and therefore, unbalanced use of the communication schemes by the plural mobile terminals 101 can be suppressed and improvement of the communication quality can be facilitated.

The predetermined information used by the switching unit 113 to select the communication scheme may include the measurement result of the radio propagation state between the mobile terminal 101 and the base station 110 for each of the plural communication schemes. Thus, communication between the mobile terminal 101 and the network 130 is enabled based on the communication scheme whose communication quality is high in the radio section between the mobile terminal 101 and the base station 110, among the plural communication schemes.

The predetermined information used by the switching unit 113 to select the communication scheme may include information that indicates the data amount transmitted and received between the mobile terminal 101 and the network. Thereby, the communication scheme can be selected based on the predetermined information that may be a value specific to each of the mobile terminals 101 and therefore, unbalanced use of the communication schemes by the plural mobile terminals 101 can be suppressed and improvement of the communication quality can be facilitated.

The predetermined information used by the switching unit 113 to select the communication scheme may include information that indicates the data type transmitted and received between the mobile terminal 101 and the network. Thereby, the communication scheme can be selected based on the predetermined information that may be a value specific to each of the mobile terminals 101 and therefore, unbalanced use of the communication schemes by the plural mobile terminals 101 can be suppressed and improvement of the communication quality can be facilitated.

The predetermined information used by the switching unit 113 to select the communication scheme may include information that indicates the contents of charges incurred by the user of the mobile terminal 101. Thereby, the communication scheme can be selected based on the predetermined information that may be a value specific to each of the mobile terminals 101 and therefore, unbalanced use of the communication schemes by the plural mobile terminals 101 can be suppressed and improvement of the communication quality can be facilitated.

The predetermined information used by the switching unit 113 to select the communication scheme may include information that indicates the state of use of the plural communication schemes by each of the mobile terminals currently connected to the base station 110. Thereby, unbalanced use of the communication schemes by the plural mobile terminals 101 connected to the base station 110 can be suppressed and improvement of the communication quality can be facilitated.

If the mobile terminals each select a communication scheme according to the radio propagation state, the radio propagation states are same for the mobile terminals located at positions close to each other and therefore, the mobile terminals may select the same communication scheme and the loads may be concentrated. On the contrary, according to the base station 110, the communication scheme is selected based on the predetermined information that may be a value specific to each of the mobile terminals 101 and therefore, unbalanced use of the communication schemes by the plural mobile terminals 101 can be suppressed and improvement of the communication quality can be facilitated.

For example, the base station 110 stores correlation information therein that is settable by the user and that correlates the contents of the predetermined information with any one of the plural communication schemes. The switching unit 113 switches the communication scheme, based on the content of the predetermined information and the correlation information. The correlation information for the content of the predetermined information and the communication schemes is settable by the user and thereby, the user (for example, the maintenance engineer of the base station 110) can adjust the condition for selecting the communication scheme, thereby improving convenience.

For example, the base station 110 stores priority rank information therein that is settable by the user and that indicates priority ranks of plural types of information included in the predetermined information. The switching unit 113 preferentially selects information whose priority rank is high among the plural types of information in the predetermined information, based on the priority rank information, and switches the communication scheme based on the selected type of information. The user can adjust the type of the information included in the predetermined information to be prioritized in the selection of the communication scheme, thereby improving convenience.

For example, if the switching unit 113 selects the first communication scheme, the switching unit 113 causes the base station 110 to not respond a request signal from the mobile terminal 101 that requests communication under the second communication scheme. Thereby, transmission by the mobile terminal 101 transmitting a request signal requesting communication under the first communication scheme can be prompted, and the communication can be switched to the first communication scheme. Even if the function of switching the communication scheme according to the result of the selection by the base station 110 is not added to the mobile terminal 101, the communication scheme of the mobile terminal 101 can be switched according to the result of the selection by the base station 110.

For example, the switching unit 113 may switch the communication scheme by transmitting to the mobile terminal 101, a signal instructing switching to a communication scheme selected from among the plural communication schemes. Thereby, even if communication is currently established between the mobile terminal 101 and the base station 110, the radio scheme can be switched seamlessly and improved convenience for the user can be facilitated.

The switching unit 113 may switch the communication scheme used in the section between the base station 110 and the network 130 of the communication between the mobile terminal 101 and the network 130. For example, the communicating unit 111 can switch between a first state and a second state.

In the first state, under the first communication scheme, the communicating unit 111 transmits to the network 130 via the first transmission route 121, data that has been received from the mobile terminal 101; and under the first communication scheme, the communicating unit 111 transmits to the mobile terminal 101 via the first transmission route 121, data that has been received from the network 130.

In the second state, the communicating unit 111 converts the protocol of data that has been received under the first communication scheme from the mobile terminal 101, into the protocol of the second communication scheme, and transmits the data to the network 130 via the second transmission route 122; and the communicating unit 111 converts the protocol of data that has been received from the network 130 via the second transmission route 122, into the protocol of the first communication scheme, and under the first communication scheme, transmits the data to the mobile terminal 101.

The switching unit 113 switches the state of the communicating unit 111 to the first or the second state and thereby, can switch the communication scheme for the section between the base station 110 and the network 130 in the communication between the mobile terminal 101 and the network 130. Thus, even if the function of switching the communication scheme according to the control of the base station 110 is not added to the mobile terminal 101, the communication scheme of the mobile terminal 101 can be switched according to the control of the base station 110.

FIG. 2 is a diagram of a specific example of the communication system. The communication system 200 depicted in FIG. 2 includes UEs 211 to 216, HeNBs 221 to 223, a broadband line 231, a provider 232, the Internet network 233, a delay measuring apparatus 234, a mobile network 235, an S-GW 236, a P-GW 237, an MME 238, and an HeMS 239.

Each of the UEs (user equipment) 211 to 216 is a portable terminal such as, for example, a portable telephone or a tablet terminal. The UEs 211 and 212 are connected to the HeNB 221. The UEs 213 and 214 are connected to the HeNB 222. The UEs 215 and 216 are connected to the HeNB 223.

Each of the UEs 211 to 216 can communicate by radio under any of the plural communication schemes. Each of the UEs 211 to 216 can communicate with the HeNBs 221 to 223 by switching between the LTE and WiFi schemes.

The HeNBs 221 to 223 are each a base station installed in, for example, an indoor position, are each connected to the broadband line 231, and can each communicate by radio under any one of the plural communication schemes. For example, the HeNBs 221 to 223 each can switch between the LTE and WiFi schemes and thereby, can communicate with the UEs 211 to 216.

The broadband line 231 is connected to the Internet network 233 through the provider 232. The Internet network 233 is connected to the delay measuring apparatus 234. The configuration of the delay measuring apparatus 234 will be described later (with reference to, for example, FIGS. 7A and 7B).

The broadband line 231 is connected to the mobile network 235 through the serving-gateway (S-GW) 236. Thereby, each of the HeNBs 221 to 223 can be connected to the mobile network 235 through the broadband line 231.

The mobile network 235 is a mobile communication network that is connected to the Internet network 233 through the packet data network-gateway (P-GW) 237; and is connected to a mobility management entity (MME) 238 and a HeNB management system (HeMS) 239. The MME 238 executes, for example, a call management process for LTE. The HeMS 239 executes a management process for the HeNBs 221 to 223.

When each of the UEs 211 to 216 is connected to the Internet network 233, for example, each of the UEs 211 to 216 is connected to the Internet network 233 through the broadband line 231, the S-GW 236, the mobile network 235, and the P-GW 237. When each of the UEs 211 to 216 is connected to the Internet network 233 using WiFi, for example, each of the UEs 211 to 216 is connected to the Internet network 233 through the broadband line 231 and the provider 232 without using the mobile network 235.

The mobile terminal 101 depicted in FIGS. 1A and 1B can be implemented by, for example, any one of the UEs 211 to 216. The base station 110 depicted in FIGS. 1A and 1B can be implemented by, for example, any one of the HeNBs 221 to 223. The network 130 depicted in FIGS. 1A and 1B can be implemented by, for example, the Internet network 233.

Among the first and the second transmission routes 121 and 122 depicted in FIGS. 1A and 1B, one of the routes 121, 122 can be implemented by, for example, a transmission route passing through the broadband line 231, the S-GW 236, the mobile network 235, and the P-GW 237. The other route 121, 122 among the first and the second transmission routes 121 and 122 depicted in FIGS. 1A and 1B can be implemented by, for example, a transmission route passing through the broadband line 231 and the provider 232.

FIG. 3A is a diagram of an example of the configuration of the HeNB. Each of the HeNBs 221 to 223 depicted in FIG. 2 can be implemented by, for example, a HeNB 300 depicted in FIG. 3A. The HeNB 300 includes antennas 311 and 312, an LTE processing unit 313, a WiFi processing unit 314, a switching control processing unit 315, and an external INF 316.

The LTE processing unit 313 executes communication based on the LTE scheme with the UE (for example, any one of the UEs 211 to 216) through the antenna 311. The WiFi processing unit 314 executes communication based on the WiFi scheme with the UE (for example, the UEs 211 to 216) through the antenna 312.

The switching control processing unit 315 is connected to the broadband line 231 (see, e.g., FIG. 2), and switches between a state to relay communication between the broadband line 231 and the LTE processing unit 313, and a state to relay communication between the broadband line 231 and the WiFi processing unit 314. Thereby, the communication scheme can be switched to the LTE or WiFi scheme.

The switching control processing unit 315 switches the communication scheme for each UE based on the result of the measurement of the delay amount of the network, based on the LTE scheme and the result of the measurement of the delay amount of the network based on the WiFi scheme; and switches the selection condition, etc., of the communication scheme based on an instruction signal output from the external INF 316. The configuration of the switching control processing unit 315 will be described later (with reference to, for example, FIG. 4). The external INF 316 is an interface that is connected to a personal computer (PC), etc. and that outputs to the switching control processing unit 315, an instruction signal input from the PC, etc.

The communicating unit 111 depicted in FIGS. 1A and 1B can be implemented by, for example, the antennas 311 and 312, the LTE processing unit 313, the WiFi processing unit 314, and the switching control processing unit 315. The measuring unit 112 and the switching unit 113 depicted in FIGS. 1A and 1B can be implemented by, for example, the switching control processing unit 315.

FIG. 3B is a diagram of an example of a circuit configuration of the HeNB depicted in FIG. 3A. The HeNB 300 depicted in FIG. 3A can be implemented by, for example, an FR_IC. 321, an LSI 322, an SoC 323, memory 324, a CPU 325, memory 326, and an FPGA 327 as depicted in FIG. 3B.

The LTE processing unit 313 depicted in FIG. 3A can be implemented by, for example, the radio frequency_integrated circuit (RF_IC) 321 that executes radio frequency (RF) processing, the system-on-a-chip (SoC) 323, and the memory 324.

The WiFi processing unit 314 depicted in FIG. 3A can be implemented by, for example, the large scale integration (LSI) 322. The switching control processing unit 315 depicted in FIG. 3A can be implemented by, for example, the central processing unit (CPU) 325 and the memory 326. The external INF 316 depicted in FIG. 3A can be implemented by, for example, the field programmable gate array (FPGA) 327.

Figure 4:
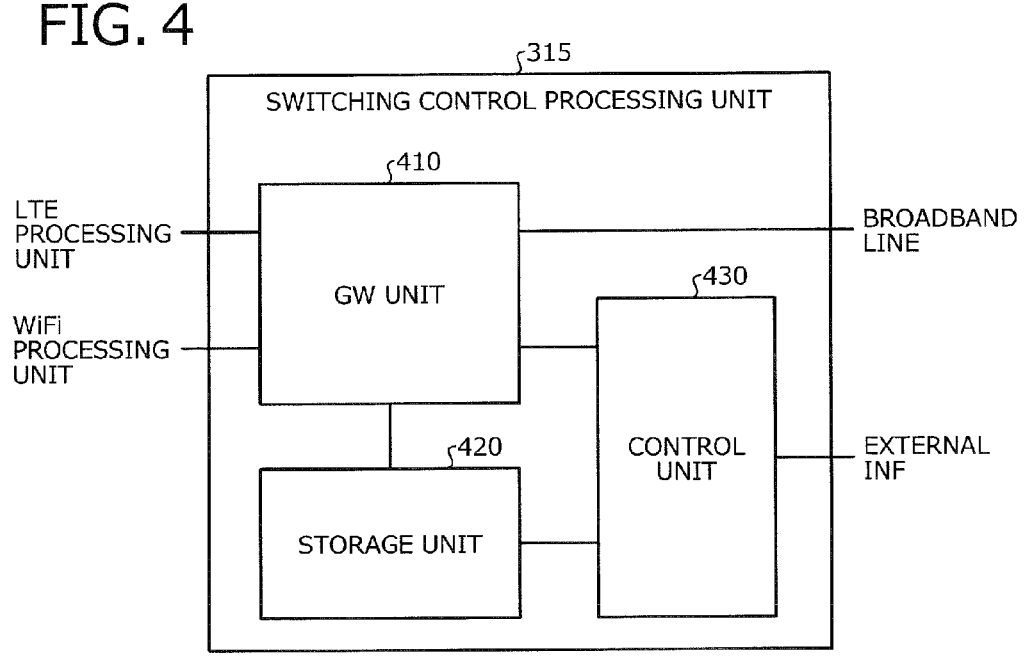
FIG. 4 is a diagram of an example of a configuration of a switching control processing unit.

FIG. 4 is a diagram of an example of the configuration of the switching control processing unit. The switching control processing unit 315 depicted in FIG. 3A includes, for example, a GW unit 410, a storage unit 420, and a control unit 430 as depicted in FIG. 4.

The GW unit 410 is a gateway that relays the communication between the LTE processing unit 313 and the WiFi processing unit 314 (see, e.g., FIG. 3A), and the broadband line 231 (see, e.g., FIG. 2). The GW unit 410 connects any one of the LTE processing unit 313 and the WiFi processing unit 314, to the broadband line 231 according to the control of the control unit 430. Thereby, the communication scheme can be switched to the LTE or WiFi scheme.

The storage unit 420 receives from the external INF 316 through the control unit 430, input of a selection condition for the communication scheme stored therein. The storage unit 420 stores therein the priority rank information concerning the selection condition for the communication scheme input thereinto by the external INF 316 via the control unit 430 (see, e.g., FIGS. 8 and 9).

The control unit 430 transmits a delay measurement signal to the broadband line 231 through the GW unit 410 and thereby, executes measurement of the delay amount of the network based on LTE and the delay amount of the network based on the WiFi scheme.

For example, the control unit 430 stores therein the IP address of the HeMS 239 that is connected to the mobile network 235; periodically (for example, every one [sec]) transmits the delay measurement signal to the HeMS 239; stores the transmission time of the delay measurement signal to the storage unit 420; receives another delay measurement signal transmitted from the HeMS 239 in response to the transmitted delay measurement signal; and stores the reception time to the storage unit 420.

The control unit 430 stores to the storage unit 420, the reception time and the transmission time of the HeMS 239 stored in the received delay measurement signal, and can calculate the delay amount for LTE based on the transmission times and the reception times stored in the storage unit 420. For example, the control unit 430 can calculate the delay amount for LTE by calculating the sum of the difference between the transmission time at the control unit 430 and the reception time at the HeMS 239 and the difference between the transmission time at the HeMS 239 and the reception time at the control unit 430.

The control unit 430 stores therein the IP address of the delay measuring apparatus 234 connected to the Internet network 233; periodically (for example, every one [sec]) transmits the delay measurement signal to the delay measuring apparatus 234 through the provider 232; stores the transmission time of the delay measurement signal to the storage unit 420; receives another delay measurement signal transmitted from the delay measuring apparatus 234 through the provider 232 in response to the transmitted delay measurement signal; and stores the reception time to the storage unit 420.

The control unit 430 stores to the storage unit 420, the reception time and the transmission time at the delay measuring apparatus 234 stored in the received delay measurement signal, and can calculate the delay amount for WiFi based on the transmission times and the reception times stored in the storage unit 420. For example, the control unit 430 can calculate the delay amount for WiFi by calculating the sum of the difference between the transmission time at the control unit 430 and the reception time at the delay measuring apparatus 234 and the difference between the transmission time at the delay measuring apparatus 234 and the reception time at the control unit 430.

The control unit 430 controls the switching of the communication scheme of each UE executing the radio communication with the HeNB 300, based on the measurement results of the delay amount of the network for the LTE and WiFi schemes, etc., and state information and the priority rank information stored in the storage unit 420, etc. The control of the switching of the communication scheme will be described later (with reference to, for example, FIGS. 8 to 11).

Figure 5A:
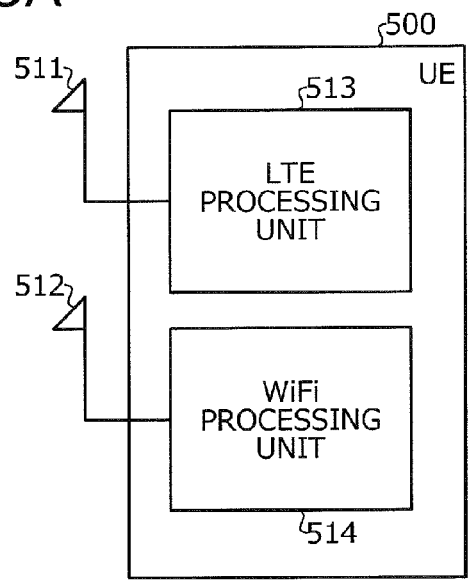
FIG. 5A is a diagram of an example of a configuration of UE.

FIG. 5A is a diagram of an example of the configuration of the UE. Each of the UEs 211 to 216 depicted in FIG. 2 can be implemented by, for example, a UE 500 depicted in FIG. 5A. The UE 500 includes antennas 511 and 512, an LTE processing unit 513, and a WiFi processing unit 514.

The LTE processing unit 513 executes radio communication based on the LTE with the HeNB (for example, any one of the HeNBs 221 to 223) through the antenna 511. The WiFi processing unit 514 executes radio communication based on WiFi with the HeNB (for example, any one of the HeNBs 221 to 223) through the antenna 512. For example, the LTE processing unit 513 and the WiFi processing unit 514 each operate independently from each other.

Figure 5B:
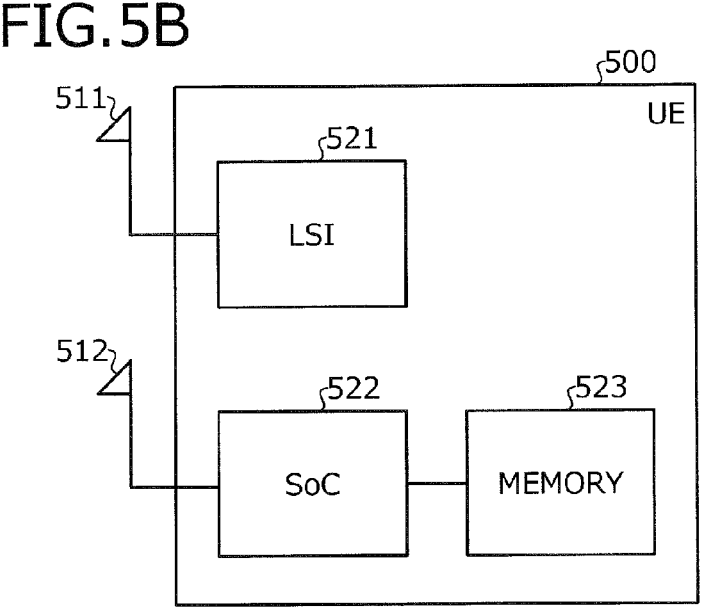
FIG. 5B is a diagram of an example of a circuit configuration of the UE depicted in FIG. 5A.

FIG. 5B is a diagram of an example of the circuit configuration of the UE depicted in FIG. 5A. The UE 500 depicted in FIG. 5A can be implemented by, for example, an LSI 521, an SoC 522, and memory 523 as depicted in FIG. 5B. The LTE processing unit 513 depicted in FIG. 5A can be implemented by, for example, the LSI 521. The LTE processing unit 513 depicted in FIG. 5A can be implemented by, for example, the SoC 522 and the memory 523.

Figure 6A:
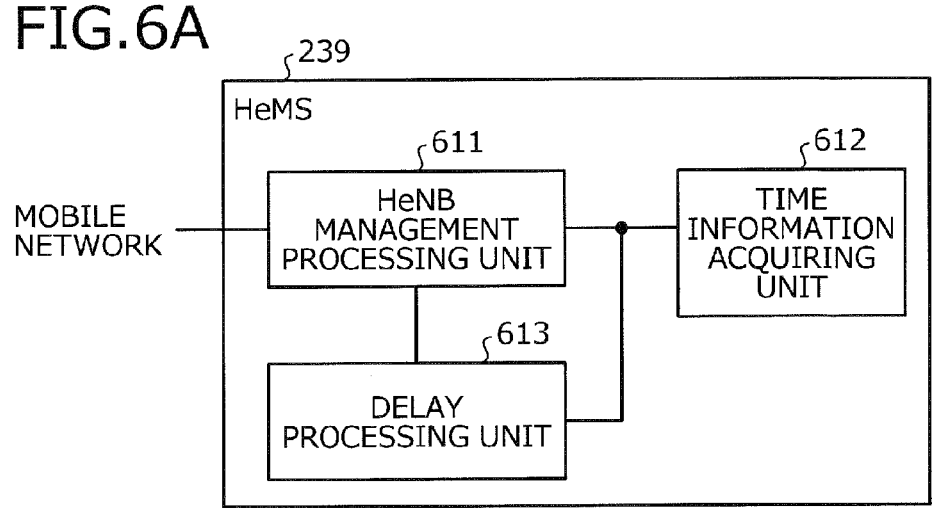
FIG. 6A is a diagram of an example of a configuration of a HeMS.

FIG. 6A is a diagram of an example of the configuration of the HeMS. The HeMS 239 depicted in FIG. 2 includes, for example, an HeNB management processing unit 611, a time information acquiring unit 612, and a delay processing unit 613 as depicted in FIG. 6A.

The HeNB management processing unit 611 executes communication with the HeNBs 221 to 223 through the mobile network 235 and thereby, executes processes such as the fault management for the HeNBs 221 to 223, the configuration management for the network apparatuses, the performance management, and the security management. The time information acquiring unit 612 acquires the current time.

When the delay processing unit 613 receives an uplink delay measurement signal from each of the HeNBs 221 to 223 through the HeNB management processing unit 611, the delay processing unit 613 transmits a downlink delay measurement signal back to each of the HeNBs 221 to 223 through the HeNB management processing unit 611. In this case, the delay processing unit 613 stores the reception time of the uplink delay measurement signal and the transmission time of the downlink delay measurement signal, in the downlink delay measurement signal to be transmitted back, based on the current time acquired by the time information acquiring unit 612.

Figure 6B:
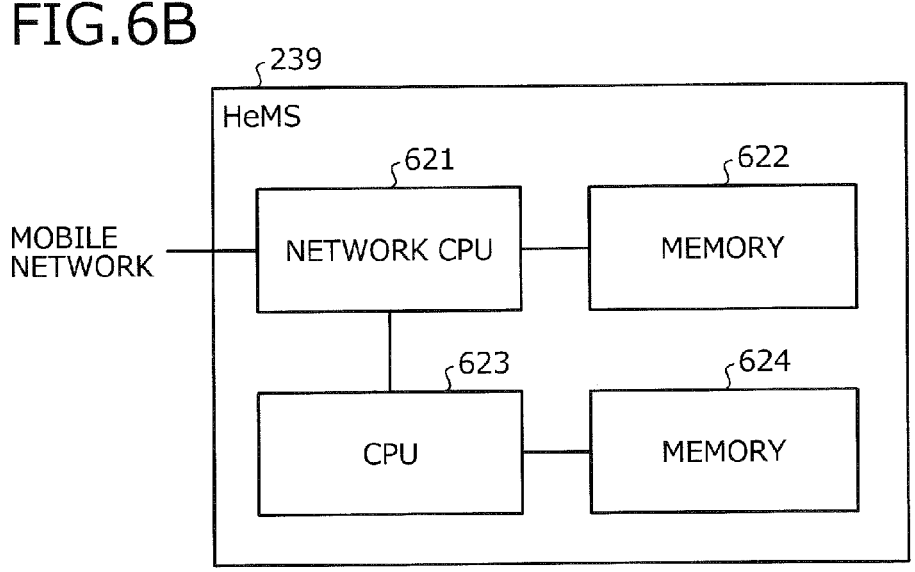
FIG. 6B is a diagram of an example of a circuit configuration of the HeMS depicted in FIG. 6A.

FIG. 6B is a diagram of an example of the circuit configuration of the HeMS depicted in FIG. 6A. The HeMS depicted in FIG. 6A can be implemented by, for example, a network CPU 621, memory 622 and 624, and a CPU 623 as depicted in FIG. 6B. The HeNB management processing unit 611 depicted in FIG. 6A can be implemented by, for example, the network CPU 621 and the memory 622. The time information acquiring unit 612 depicted in FIG. 6A can be implemented by, for example, the CPU 623 and the memory 624. The delay processing unit 613 depicted in FIG. 6A can be implemented by, for example, the CPU 623 and the memory 624.

Figure 7A:
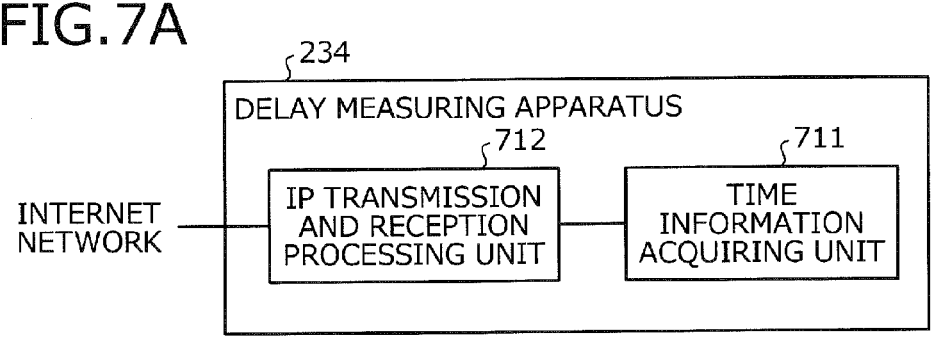
FIG. 7A is a diagram of an example of a configuration of a delay measuring apparatus.

FIG. 7A is a diagram of an example of the configuration of the delay measuring apparatus. The delay measuring apparatus 234 depicted in FIG. 2 includes, for example, an IP transmission and reception processing unit 712 and a time information acquiring unit 711 as depicted in FIG. 7A. The time information acquiring unit 711 acquires the current time.

The IP transmission and reception processing unit 712 executes communication with each of the HeNBe 221 to 223 through the provider 232 and the Internet network 233. When the IP transmission and reception processing unit 712 receives the uplink delay measurement signal from each of the HeNBs 221 to 223, the IP transmission and reception processing unit 712 transmits the downlink delay measurement signal back to each of the HeNBs 221 to 223. In this case, the IP transmission and reception processing unit 712 stores the reception time of the uplink delay measurement signal and the transmission time of the downlink delay measurement signal in the downlink delay measurement signal to be transmitted back, based on the current time acquired by the time information acquiring unit 711.

Figure 7B:
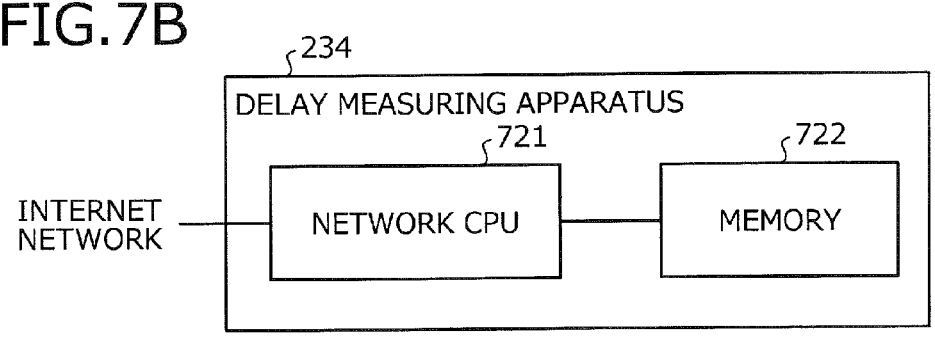
FIG. 7B is a diagram of an example of a circuit configuration of the delay measuring apparatus depicted in FIG. 7A.

FIG. 7B is a diagram of an example of the circuit configuration of the delay measuring apparatus depicted in FIG. 7A. The delay measuring apparatus 234 depicted in FIG. 7A can be implemented by, for example, a network CPU 721 and memory 722 as depicted in FIG. 7B. The time information acquiring unit 711 depicted in FIG. 7A can be implemented by, for example, the network CPU 721 and the memory 722. The IP transmission and reception processing unit 712 depicted in FIG. 7A can be implemented by, for example, the network CPU 721 and the memory 722.

FIG. 8 is a diagram of an example of a selection condition table for the communication scheme. The storage unit 420 of the HeNB 300 (see, e.g., FIG. 4) stores, for example, the selection condition table 800 depicted in FIG. 8. The selection condition table 800 of each of the HeNBs 221 to 223 installed in homes is set by, for example, the maintenance engineer therefor through the external INF 316 (see, e.g., FIG. 3A). The selection condition table 800 may have a default value set therein before the setting thereof by the maintenance engineer.

The selection condition table 800 presents correlation information that indicates the "communication scheme" and the "item for selection" correlating the "communication scheme" with each "item for selection". The "item for selection" presents a condition to select a communication scheme. The "communication scheme" presents a communication scheme to be selected when the condition presented by the "item for selection" is satisfied. In the example depicted in FIG. 8, the "communication scheme" presents the LTE or WiFi scheme.

The "service" presents information indicating the type of data transmitted and received between the UE and a network (for example, the Internet network 233) and can be determined based on, for example, data relayed by the HeNB 300.

"Radio propagation state" presents the measurement result of the radio propagation state (radio quality) between the UE and the HeNB 300 for each of the LTE and WiFi and can be determined based on, for example, the received signal strength indicator (RSSI) measured by the UE and reported to the HeNB 300, etc.

The "data amount" presents information indicating the amount of data transmitted and received between the UE and the network (for example, the Internet network 233), represents the amount of data transmitted and received between the UE and the network, and can be determined based on, for example, the data relayed by the HeNB 300.

The "NW quality" presents the communication quality of the network for each of the LTE and WiFi schemes, that is measured by the HeNB 300 and can be determined by, for example, transmission by the control unit 430 of the delay measurement signal to the HeMS 239 and the delay measuring apparatus 234. The "rate plan" presents the rate plan that is based on the contract between the user of the UE and the communications provider and is stored in advance in, for example, the storage unit 420 of the HeNB 300 for each UE.

For example, when a PC is connected to the external INF 316 of the HeNB 300, the selection condition table 800 depicted in FIG. 8 is displayed on the PC. The user can adjust the condition for selecting the communication scheme by entering a circle on either "LTE" or "WiFi" in the "communication scheme" column of the selection condition table 800.

For example, as to "service 1 (data transfer)", the data amount is large and therefore, the communication can be set to end quickly by selecting "LTE". As to "rate plan 2 (mobile: flat rate system, provider: meter rate billing), when contents such as a moving image is downloaded, the charge can be suppressed by applying the flat rate system by selecting "LTE".

FIG. 9 is a diagram of an example of the priority rank information. The storage unit 420 of the HeNB 300 (see, e.g., FIG. 4) stores, for example, priority rank information 900 depicted in FIG. 9. The priority rank information 900 of each of the HeNBs 221 to 223 installed in homes is set by, for example, the maintenance engineer through the external INF 316 (see, e.g., FIG. 3A). The priority rank information 900 may have a default value set therein before the setting by the maintenance engineer.

In the priority rank information 900, a "priority rank" is correlated with each "item group for selection". The "item group for selection" presents a group of conditions to select a communication scheme. Each "item for selection" of the selection condition table 800 depicted in FIG. 8 belongs to any one of groups presented by the "item group for selection" of the priority rank information 900 depicted in FIG. 9.

For example, "service 1 (data transfer)", "service 2 (mail service)", "service 3 (mail service)", and "service 4 (VoLTE)" of the selection condition table 800 belong to the "service (other than priority call)" of the priority rank information 900, and "service 5 (priority call)" of the selection condition table 800 belongs to the "service (priority call)" of the priority rank information 900.

For example, the selection condition table 800 and the priority rank information 900 stored in the HeNB 221 may be stored for each UE that is connectable to the HeNB 221 when plural UEs are present that are connectable to the HeNB 221. The selection condition table 800 and the priority rank information 900 stored in each of the HeNBs 222 and 223 may, for example, similarly be stored for each UE connectable thereto.

The "priority rank" presents the rank for the prioritization in the selection of the communication scheme in each group presented by the "item group for selection". The control unit 430 of the HeNB 300 (see, e.g., FIG. 4) selects a communication scheme by determining with priority the group whose "priority rank" is high among the groups presented by the "item group for selection".

Figure 10A:
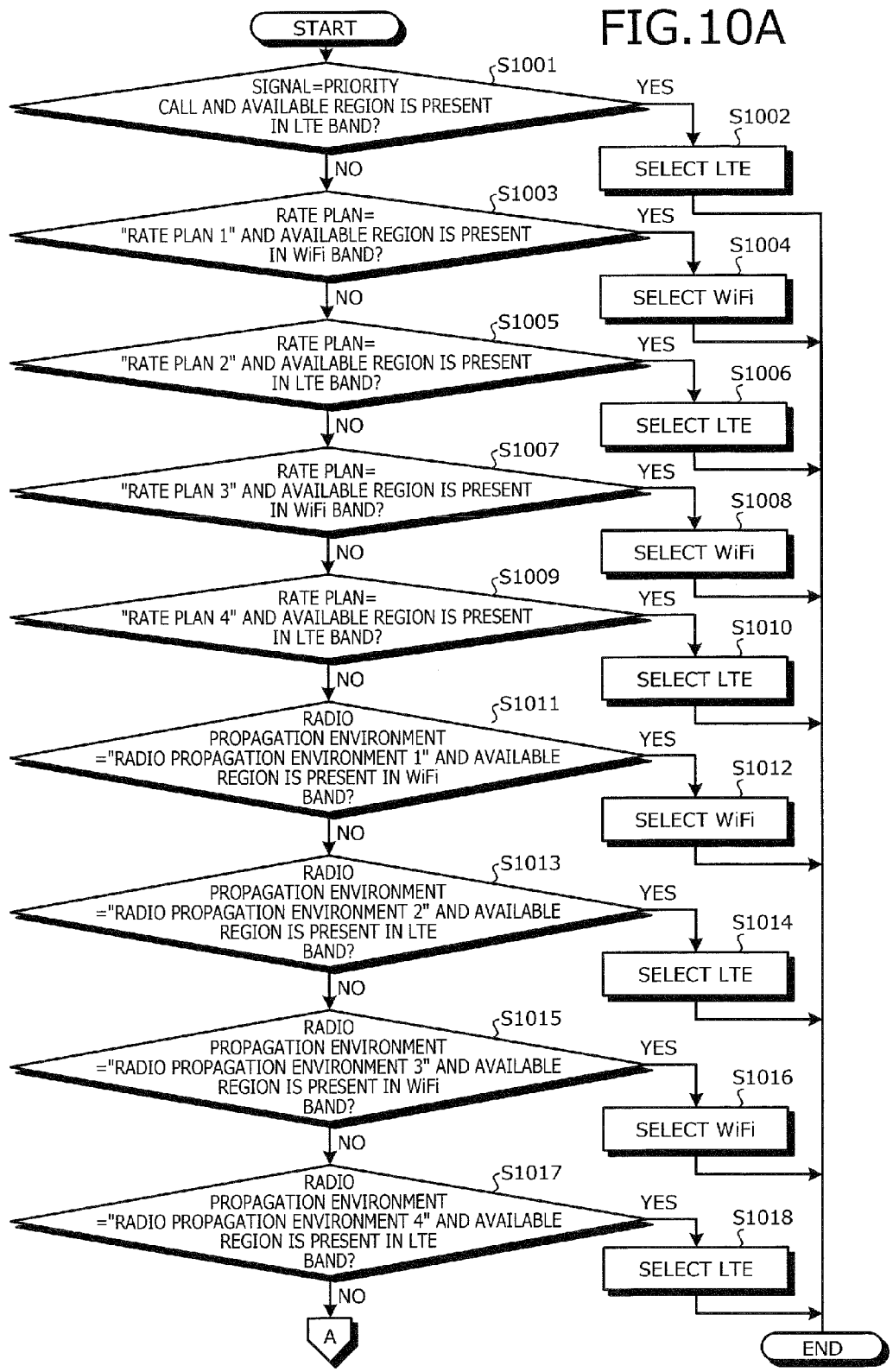
FIGS. 10A and 10B are a flowchart of an example of a selection process of the HeNB.
Figure 10B:
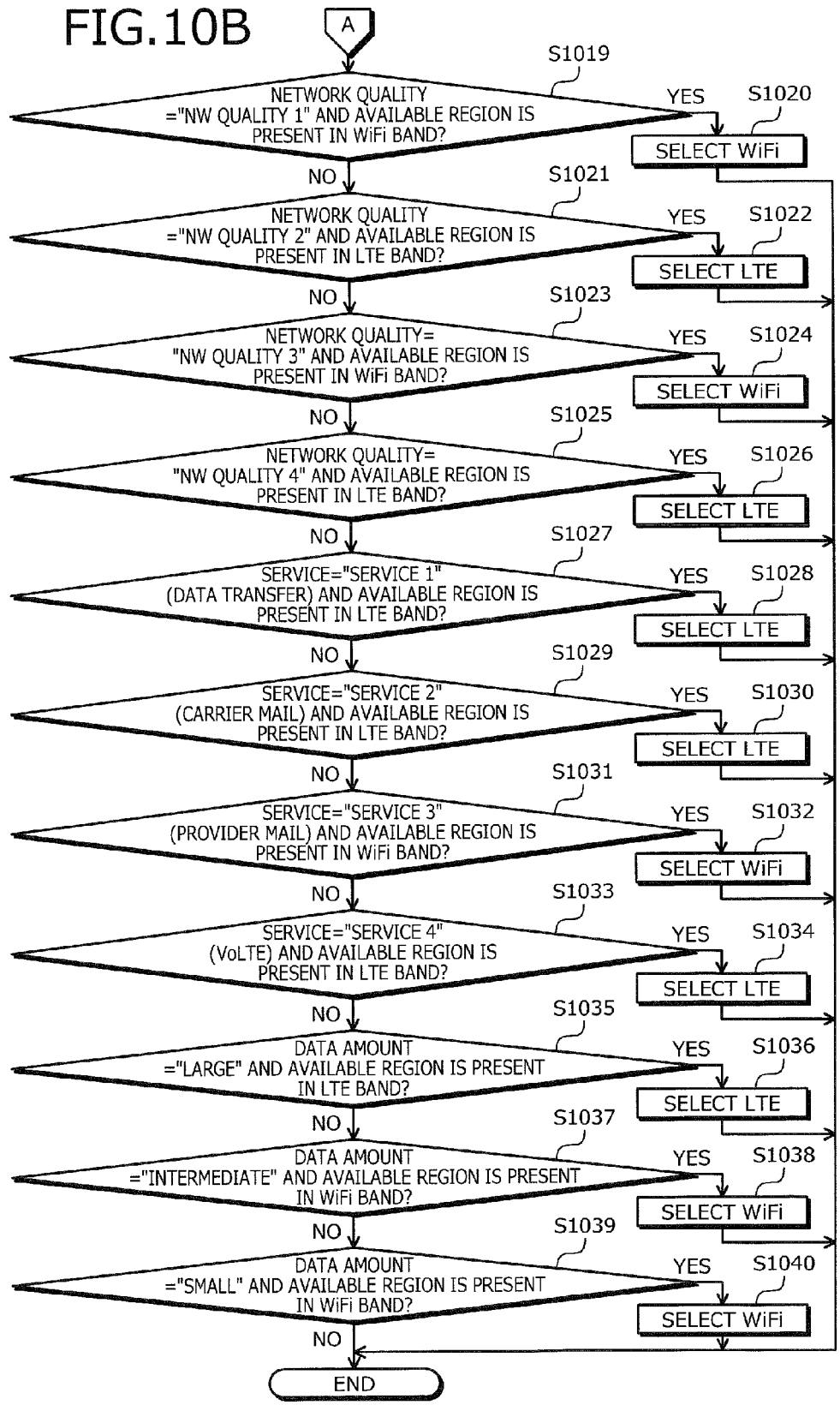

FIGS. 10A and 10B are a flowchart of an example of a selection process of the HeNB. The control unit 430 of the HeNB 300 (see, e.g., FIG. 4) selects the communication scheme by, for example, executing steps depicted in FIGS. 10A and 10B for each UE executing radio communication with the HeNB 300. A case where the selection condition table 800 depicted in FIG. 8 and the priority rank information 900 depicted in FIG. 9 are set in the storage unit 420 of the HeNB 300 will be described with reference to FIGS. 10A and 10B.

As depicted in FIG. 10A, the control unit 430 determines whether a signal of the UE for the communication is a priority call and whether an available region is present in the LTE band (step S1001). Whether an available region is present in the LTE band can be determined based on, for example, whether the number of UEs executing the radio communication based on the LTE scheme with the HeNB 300 exceeds a predetermined number.

If the control unit 430 determines at step S1001 that the signal of the UE for the communication is a priority call and an available region is present in the LTE band (step S1001: YES), the control unit 430 selects LTE as the communication scheme for the UE (step S1002) and causes the series of process steps to come to an end. If the control unit 430 determines that the signal of the UE for the communication is not a priority call or no available region is present in the LTE band (step S1001: NO), the control unit 430 proceeds to the operation at step S1003.

The control unit 430 determines whether the rate plan of the UE for the communication is "rate plan 1" and whether an available region is present in the WiFi band (step S1003). The rate plan of the UE for communication can be determined based on, for example, information transmitted from the UE for the communication. Whether an available region is present in the WiFi band can be determined based on, for example, whether the number of UEs executing radio communication based on the WiFi scheme with the HeNB 300 exceeds a predetermined number.

If the control unit 430 determines that the rate plan of the UE for the communication is "rate plan 1" and an available region is present in the WiFi band (step S1003: YES), the control unit 430 selects WiFi as the communication scheme for the UE (step S1004) and causes the series of process steps to come to an end. If the control unit 430 determines that the rate plan of the UE for the communication is not "rate plan 1" or no available region is present in the WiFi band (step S1003: NO), the control unit 430 proceeds to the operation at step S1005.

The control unit 430 determines whether the rate plan of the UE for the communication is "rate plan 2" and whether an available region is present in the LTE band (step S1005). If the control unit 430 determines that the rate plan of the UE for the communication is "rate plan 2" and an available region is present in the LTE band (step S1005: YES), the control unit 430 selects LTE as the communication scheme for the UE (step S1006) and causes the series of process steps to come to an end. If the control unit 430 determines that the rate plan of the UE for the communication is not "rate plan 2" or no available region is present in the LTE band (step S1005: NO), the control unit 430 proceeds to the operation at step S1007.

The control unit 430 determines whether the rate plan of the UE for the communication is "rate plan 3" and whether an available region is present in the WiFi band (step S1007). If the control unit 430 determines that the rate plan of the UE for the communication is "rate plan 3" and an available region is present in the WiFi band (step S1007: YES), the control unit 430 selects WiFi as the communication scheme for the UE (step S1008) and causes the series of process steps to come to an end. If the control unit 430 determines that the rate plan of the UE for the communication is not "rate plan 3" or no available region is present in the WiFi band (step S1007: NO), the control unit 430 proceeds to the operation at step S1009.

The control unit 430 determines whether the rate plan of the UE for the communication is "rate plan 4" and an available region is present in the LTE band (step S1009). When the control unit 430 determines that the rate plan of the UE for the communication is "rate plan 4" and an available region is present in the LTE band (step S1009: YES), the control unit 430 selects LTE as the communication scheme for the UE (step S1010) and causes the series of process steps to come to an end. If the control unit 430 determines that the rate plan of the UE for the communication is not "rate plan 4" or no available region is present in the LTE band (step S1009: NO), the control unit 430 proceeds to the operation at step S1011.

By executing the operations at steps S1003 to S1010, for example, when the LTE (mobile) rate plan of the UE for the communication is a flat rate system, the LTE can be selected preferentially as the communication scheme for the UE. When the LTE (mobile) rate plan of the UE for the communication is meter rate billing, WiFi can be selected preferentially as the communication scheme for the UE.

The control unit 430 determines whether the radio propagation environment between the UE for the communication and the HeNB 300 is "radio propagation environment 1" and whether an available region is present in the WiFi band (step S1011). If the control unit 430 determines that the radio propagation environment between the UE for the communication and the HeNB 300 is "radio propagation environment 1" and an available region is present in the WiFi band (step S1011: YES), the control unit 430 selects WiFi as the communication scheme for the UE (step S1012) and causes the series of process steps to come to an end. If the control unit 430 determines that the radio propagation environment between the UE for the communication and the HeNB 300 is not "radio propagation environment 1" or no available region is present in the WiFi band (step S1011: NO), the control unit 430 proceeds to the operation at step S1013.

The control unit 430 determines whether the radio propagation environment between the UE for the communication and the HeNB 300 is "radio propagation environment 2" and whether an available region is present in the LTE band (step S1013). If the control unit 430 determines that the radio propagation environment between the UE for the communication and the HeNB 300 is "radio propagation environment 2" and an available region is present in the LTE band (step S1013: YES), the control unit 430 selects LTE as the communication scheme for the UE (step S1014) and causes the series of process steps to come to an end. If the control unit 430 determines that the radio propagation environment between the UE for the communication and the HeNB 300 is not "radio propagation environment 2" or no available region is present in the LTE band (step S1013: NO), the control unit 430 proceeds to the operation at step S1015.

The control unit 430 determines whether the radio propagation environment between the UE for the communication and the HeNB 300 is "radio propagation environment 3" and whether an available region is present in the WiFi band (step S1015). If the control unit 430 determines that the radio propagation environment between the UE for the communication and the HeNB 300 is "radio propagation environment 3" and an available region is present in the WiFi band (step S1015: YES), the control unit 430 selects WiFi as the communication scheme for the UE (step S1016) and causes the series of process steps to come to an end. If the control unit 430 determines that the radio propagation environment between the UE for the communication and the HeNB 300 is not "radio propagation environment 3" or no available region is present in the WiFi band (step S1015: NO), the control unit 430 proceeds to the operation at step S1017.

The control unit 430 determines whether the radio propagation environment between the UE for the communication and the HeNB 300 is "radio propagation environment 4" and whether an available region is present in the LTE band (step S1017). If the control unit 430 determines that the radio propagation environment between the UE for the communication and the HeNB 300 is "radio propagation environment 4" and an available region is present in the LTE band (step S1017: YES), the control unit 430 selects LTE as the communication scheme for the UE (step S1018) and causes the series of process steps to come to an end. If the control unit 430 determines that the radio propagation environment between the UE for the communication and the HeNB 300 is not "radio propagation environment 4" or no available region is present in the LTE band (step S1017: NO), the control unit 430 proceeds to the operation at step S1019 depicted in FIG. 10B.

By executing the operations at steps S1011 to S1018, for example, when the radio propagation environment for the UE is favorable for WiFi, WiFi can be selected preferentially as the communication scheme for the UE. When the radio propagation environment for the UE is poor for WiFi, the LTE can be selected preferentially as the communication scheme for the UE.

As depicted in FIG. 10B, the control unit 430 determines whether the network quality is "NW quality 1 " and whether an available region is present in the WiFi band (step S1019). If the control unit 430 determines that the network quality is "NW quality 1 " and an available region is present in the WiFi band (step S1019: YES), the control unit 430 selects WiFi as the communication scheme for the UE (step S1020) and causes the series of process steps to come to an end. If the control unit 430 determines that the network quality is not "NW quality 1" or no available region is present in the WiFi band (step S1019: NO), the control unit 430 proceeds to the operation at step S1021.

The control unit 430 determines whether the network quality is "NW quality 2" and whether an available region is present in the LTE band (step S1021). If the control unit 430 determines that the network quality is "NW quality 2" and an available region is present in the LTE band (step S1021: YES), the control unit 430 selects LTE as the communication scheme for the UE (step S1022) and causes the series of process steps to come to an end. If the control unit 430 determines that the network quality is not "NW quality 1" or no available region is present in the LTE band (step S1021: NO), the control unit 430 proceeds to the operation at step S1023.

The control unit 430 determines whether the network quality is "NW quality 3" and whether an available region is present in the WiFi band (step S1023). If the control unit 430 determines that the network quality is "NW quality 3" and an available region is present in the WiFi band (step S1023: YES), the control unit 430 selects WiFi as the communication scheme for the UE (step S1024) and causes the series of process steps to come to an end. If the control unit 430 determines that the network quality is not "NW quality 3" or no available region is present in the WiFi band (step S1023: NO), the control unit 430 proceeds to the operation at step S1025.

The control unit 430 determines whether the network quality is "NW quality 4" and whether an available region is present in the LTE band (step S1025). If the control unit 430 determines that the network quality is "NW quality 4" and an available region is present in the LTE band (step S1025: YES), the control unit 430 selects LTE as the communication scheme for the UE (step S1026) and causes the series of process steps to come to an end. When the control unit 430 determines that the network quality is not "NW quality 4" or no available region is present in the LTE band (step S1025: NO), the control unit 430 proceeds to the operation at step S1027.

By executing the operations at steps S1019 to S1026, for example, when the delay of LTE (mobile) for the UE is small, LTE can be selected preferentially as the communication scheme for the UE. When the delay of LTE for the UE is large, WiFi can be selected preferentially as the communication scheme for the UE.

The control unit 430 determines whether the service of the signal is "service 1" (data transfer) and whether an available region is present in the LTE band (step S1027). If the control unit 430 determines that the service of the signal is "service 1" and an available region is present in the LTE band (step S1027: YES), the control unit 430 selects LTE as the communication scheme for the UE (step S1028) and causes the series of process steps to come to an end. If the control unit 430 determines that the service of the signal is not "service 1" or no available region is present in the LTE band (step S1027: NO), the control unit 430 proceeds to the operation at step S1029.

The control unit 430 determines whether the service of the signal is "service 2" (carrier mail) and whether an available region is present in the LTE band (step S1029). If the control unit 430 determines that the service of the signal is "service 2" and an available region is present in the LTE band (step S1029: YES), the control unit 430 selects LTE as the communication scheme for the UE (step S1030) and causes the series of process steps to come to an end. If the control unit 430 determines that the service of the signal is not "service 2" or no available region is present in the LTE band (step S1029: NO), the control unit 430 proceeds to the operation at step S1031.

The control unit 430 determines whether the service of the signal is "service 3" (provider mail) and whether an available region is present in the WiFi band (step S1031). If the control unit 430 determines that the service of the signal is "service 3" and an available region is present in the WiFi band (step S1031: YES), the control unit 430 selects WiFi as the communication scheme for the UE (step S1032) and causes the series of process steps to come to an end. If the control unit 430 determines that the service of the signal is not "service 3" or no available region is present in the WiFi band (step S1031: NO), the control unit 430 proceeds to the operation at step S1033.

The control unit 430 determines whether the service of the signal is "service 4" (VoLTE) and whether an available region is present in the LTE band (step S1033). If the control unit 430 determines that the service of the signal is "service 4" and an available region is present in the LTE band (step S1033: YES), the control unit 430 selects LTE as the communication scheme for the UE (step S1034) and causes the series of process steps to come to an end. If the control unit 430 determines that the service of the signal is not "service 4" or no available region is present in the LTE band (step S1033: NO), the control unit 430 proceeds to the operation at step S1035.

By executing the operations at steps S1027 to S1034, for example, when the service of the signal of the UE for the communication is the data transfer, the carrier-specific mail service, or the VoLTE, LTE can be selected preferentially as the communication scheme for the UE. When the service of the signal of the UE for the communication is the provider-specific mail service, WiFi can be selected preferentially as the communication scheme for the UE.

The control unit 430 determines whether the data amount transmitted and received by the UE for the communication is "large" and whether an available region is present in the LTE band (step S1035). If the control unit 430 determines that the data amount is "large" and an available region is present in the LTE band (step S1035: YES), the control unit 430 selects LTE as the communication scheme for the UE (step S1036) and causes the series of process steps to come to an end. If the control unit 430 determines that the data amount is not "large" or no available region is present in the LTE band (step S1035: NO), the control unit 430 proceeds to the operation at step S1037.

The control unit 430 determines whether the data amount transmitted and received by the UE for the communication is "intermediate" and whether an available region is present in the WiFi band (step S1037). If the control unit 430 determines that the data amount is "intermediate" and an available region is present in the WiFi band (step S1037: YES), the control unit 430 selects WiFi as the communication scheme for the UE (step S1038) and causes the series of process steps to come to an end. If the control unit 430 determines that the data amount is not "intermediate" or no available region is present in the WiFi band (step S1037: NO), the control unit 430 proceeds to the operation at step S1039.

The control unit 430 determines whether the data amount transmitted and received by the UE for the communication is "small" and whether an available region is present in the WiFi band (step S1039). If the control unit 430 determines that the data amount is "small" and an available region is present in the WiFi band (step S1039: YES), the control unit 430 selects WiFi as the communication scheme for the UE (step S1040) and causes the series of process steps to come to an end.

If the control unit 430 determines at step S1039 that the data amount is not "small" or no available region is present in the WiFi band (step S1039: NO), the control unit 430 suspends the selection of the communication scheme for the UE and causes the series of process steps to come to an end. In this case, for example, the control unit 430 again executes the selection process for the UE for which the selection of the communication scheme is suspended, after executing the selection processes for the other UEs.

By executing the operations at steps S1035 to S1040, for example, when the data amount transmitted and received by the UE for the communication is large, LTE can be selected preferentially as the communication scheme for the UE. When the data amount transmitted and received by the UE for the communication is not large, WiFi can be selected preferentially as the communication scheme for the UE.

FIG. 11 is a diagram of an example of the switching of the communication scheme of each of the UEs. In FIG. 11, the axis of abscissa represents the elapse of time. As depicted in FIG. 11, each of the UEs 211 to 216 executes the radio communication, switching the communication scheme according to state changes, under the control of the HeNB connected to the UE, of the HeNBs 221 to 223.

For example, it is assumed that, at a time T1, the network quality of WiFi (provider) deteriorates due to an increase in the traffic, etc. at the provider 232 (WiFi_NW quality deterioration). In this case, the UE 211 executing the communication based on WiFi at the time T1 switches its communication to the communication based on the LTE in the next cycle.

It is assumed that, at a time T2, the network quality of the LTE (mobile) deteriorates due to an increase in the traffic, etc. in the mobile network 235 (LTE_NW quality deterioration). In this case, the UE 212 executing the communication based on WiFi at the time T2 switches the communication to the communication based on LTE in the next cycle.

On the other hand, it is assumed that the priority rank of "data amount" is set to be higher than that of "NW quality" in the priority rank information 900 in each of the HeNBs 221 to 223 respectively connected to the UE 216 and that the data amount transmitted and received by the UE 216 is large. In this case, even when the network quality of the LTE (mobile) deteriorates, the UE 216 continues the communication based on LTE.

It is assumed that, at a time T3, the radio propagation environment of WiFi deteriorates between the UE 211 and the HeNB 221 (propagation environment deterioration). In this case, the UE 211 executing the communication based on WiFi at the time T3 switches the communication to the communication based on LTE in the next cycle.

FIG. 12 is a sequence diagram of an example of a setting operation of the HeNB in the communication system. The maintenance engineer for the HeNB 300 executes a switching logic setting for the switching control processing unit 315 of the HeNB 300 from a PC 1210 through the external INF 316 (see, e.g., FIG. 3A) (step S1201). By executing the operation at step S1201, the selection condition table 800 (see, e.g., FIG. 8) of the storage unit 420 of the switching control processing unit 315 is set.

The maintenance engineer of the HeNB 300 executes a priority rank setting for the switching control processing unit 315 of the HeNB 300 from the PC 1210 through the external INF 316 (step S1202). By executing the operation at step S1202, the priority rank information 900 (see, e.g., FIG. 9) of the storage unit 420 of the switching control processing unit 315 is set.

FIG. 13 is a sequence diagram of an example of an acquisition process for the network quality of and the radio propagation state in the communication system. The switching control processing unit 315 of the HeNB 300 transmits the delay measurement signal to the HeNB 239 (step S1301). The HeMS 239 transmits to the HeNB 300, the delay measurement signal in which the reception time and the transmission time have been stored (step S1302). Thereby, the switching control processing unit 315 of the HeNB 300 can determine the delay time period (the network quality) in the transmission route for LTE.

The switching control processing unit 315 of the HeNB 300 transmits the delay measurement signal to the delay measuring apparatus 234 (step S1303). The delay measuring apparatus 234 transmits to the HeNB 300, the delay measurement signal in which the reception time and the transmission time have been stored (step S1304). Thereby, the switching control processing unit 315 of the HeNB 300 can determine the delay time period (the network quality) in the transmission route based on WiFi.

The WiFi processing unit 314 of the HeNB 300 measures the WiFi state around the HeNB 300 (step S1305). For example, the WiFi processing unit 314 measures the reception intensity of each frequency band used for WiFi. The WiFi processing unit 314 grasps the WiFi interference state based on the measurement result acquired at step S1305 and notifies the switching control processing unit 315 of the WiFi interference state (step S1306). The switching control processing unit 315 determines the WiFi radio propagation state based on the notification issued at step S1306 (step S1307).

The UE 211 transmits an LTE signal to the HeNB 300 (step S1308). The LTE signal transmitted at step S1308 is, for example, a preamble signal in a predetermined pattern. The LTE processing unit 313 of the HeNB 300 determines the LTE interference state based on the reception level of the LTE signal transmitted at step S1308 and notifies the switching control processing unit 315 of the LTE interference state (step S1309). The switching control processing unit 315 determines the LTE radio propagation state based on the notification issued at step S1309 (step S1310).

In the communication system 200, the acquisition process depicted in FIG. 13 is periodically executed and, for example, a communication operation described below is executed.

FIG. 14A is a sequence diagram (Part I) of an example of an operation 1 executed for communication in the communication system. It is assumed that the switching control processing unit 315 of the HeNB 300 determines that the communication scheme for the UE 211 is LTE based on the network quality, the radio propagation state, etc. determined by the process depicted in FIG. 13 (step S1411) and notifies the LTE processing unit 313 of the result of the determination made at step S1411. Thereby, the communication executed by the UE 211 and the HeNB 300 based on LTE (step S1412) is started.

At step S1412, the switching control processing unit 315 of the HeNB 300 outputs to the LTE processing unit 313, the downlink data from the mobile network 235. The LTE processing unit 313 transmits by radio based on LTE, the downlink data output from the switching control processing unit 315 to the UE 211, receives the uplink data transmitted from the UE 211 by radio based on the LTE, and outputs the received uplink data to the switching control processing unit 315. The switching control processing unit 315 transmits to the mobile network 235, the uplink data output from the LTE processing unit 313.

FIG. 14B is a sequence diagram (Part II) of the example of the operation 1 executed for communication in the communication system. It is assumed that the switching control processing unit 315 of the HeNB 300 determines that the communication scheme for the UE 211 is WiFi based on the network quality, the radio propagation state, etc., determined according to the process depicted in FIG. 13 (step S1421) and notifies the WiFi processing unit 314 of the result of the determination made at step S1421. Thereby, the communication executed by the UE 211 and the HeNB 300 based on WiFi (step S1422) is started.

At step S1422, the switching control processing unit 315 of the HeNB 300 outputs to the WiFi processing unit 314, the downlink data from the Internet network 233. The WiFi processing unit 314 transmits by radio based on WiFi, the downlink data output from the switching control processing unit 315 to the UE 211, receives the uplink data transmitted from the UE 211 by radio based on WiFi, and outputs the received uplink data to the switching control processing unit 315. The switching control processing unit 315 transmits the uplink data output from the WiFi processing unit 314 to the Internet network 233.

FIG. 15A is a sequence diagram (Part I) of an example of an operation 2 executed for communication in the communication system. It is assumed that the switching control processing unit 315 of the HeNB 300 determines that the communication scheme for the UE 211 is LTE, based on the network quality, the radio propagation state, etc., determined according to the process depicted in FIG. 13 (step S1511) and notifies both the LTE processing unit 313 and the WiFi processing unit 314 of the result of the determination made at step S1511. Thereby, even when a request for the communication based on WiFi is issued from the UE 211 (step S1512), the WiFi processing unit 314 does not respond thereto (step S1513).

When a request for the communication based on LTE is issued from the UE 211 (step S1514), the LTE processing unit 313 starts the radio communication based on LTE with the UE 211. Thereby, the communication based on LTE executed by the UE 211 and the HeNB 300 (step S1515) is started. The communication based on LTE at step S1515 is same as that at step S1412 depicted in FIG. 14A.

In this manner, when the communication scheme of the UE 211 is switched to LTE, the HeNB 300 does not respond to a request for the communication based on WiFi from the UE 211 in a sequence for making a call from the UE 211. Thereby, the UE 211 is caused to issue the request for the communication based on LTE and the request for the communication based on LTE is responded to. Thus, the communication scheme of the UE 211 can be switched to LTE. Therefore, for example, even if no instruction signal, etc., is transmitted to the UE 211, the communication scheme of the UE 211 can be switched to LTE.

Figure 15B:
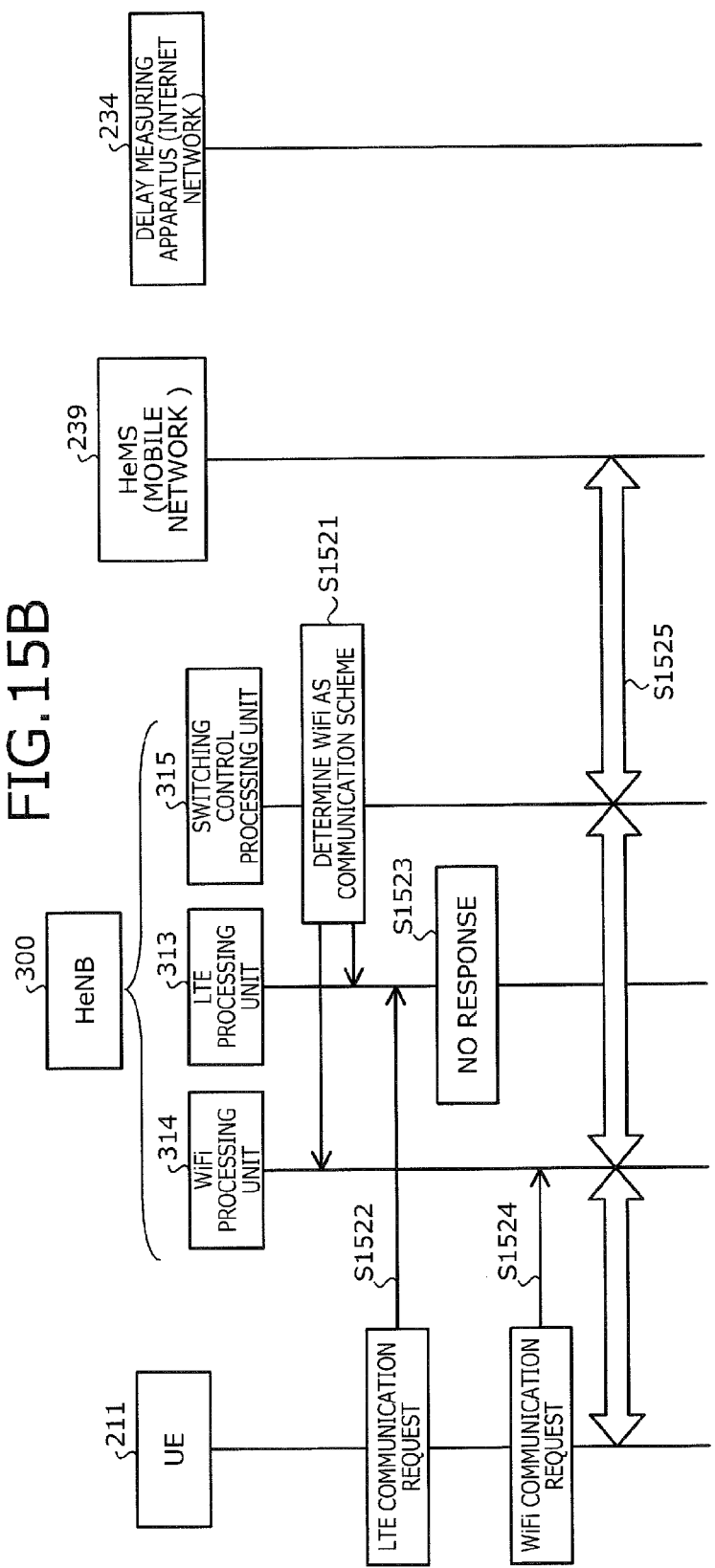
FIG. 15B is a sequence diagram (Part II) of the example of the operation 2 executed for communication in the communication system.

FIG. 15B is a sequence diagram (Part II) of the example of the operation 2 executed for communication in the communication system. It is assumed that the switching control processing unit 315 of the HeNB 300 determines that the communication scheme for the UE 211 is WiFi based on the network quality, the radio propagation state, etc., determined according to process depicted in FIG. 13 (step S1521) and notifies both the LTE processing unit 313 and the WiFi processing unit 314 of the result of the determination made at step S1521. Thereby, even when a request for the communication based on the LTE is issued from the UE 211 (step S1522), the LTE processing unit 313 does not respond thereto (step S1523).

When the request for the communication based on WiFi is issued from the UE 211 (step S1524), the WiFi processing unit 314 starts the radio communication based on WiFi with the UE 211. Thereby, the communication based on WiFi executed by the UE 211 and the HeNB 300 (step S1525) is started. The communication based on WiFi at step S1525 is same as that at step S1422 depicted in FIG. 14B.

In this manner, when the communication scheme of the UE 211 is switched to WiFi, the HeNB 300 does not respond to a request for the communication based on LTE from the UE 211 in the sequence for making a call from the UE 211. Thus, the UE 211 is caused to issue the request for the communication based on WiFi and the request for the communication based on WiFi is responded. Thereby, the communication scheme of the UE 211 can be switched to WiFi. Therefore, for example, even if no instruction signal, etc., is transmitted to the UE 211, the communication scheme of the UE 211 can be switched to WiFi.

Figure 16:
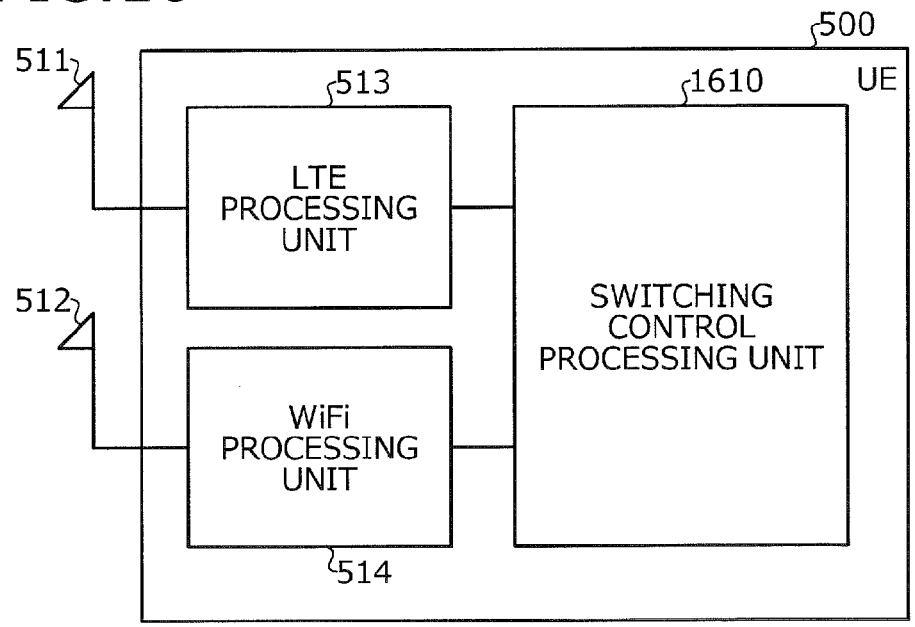
FIG. 16 is a diagram of a variation of the configuration of the UE.

FIG. 16 is a diagram of a variation of the configuration of the UE. In FIG. 16, parts identical to those depicted in FIG. 5A are given the same reference numerals used in FIG. 5A and will not again be described. As depicted in FIG. 16, the UE 500 may include a switching control processing unit 1610 in addition to the configuration depicted in FIG. 5A. The switching control processing unit 1610 receives the instruction signal from the HeNB 300 through the LTE processing unit 513 or the WiFi processing unit 514, and based on the received instruction signal, switches between communication based on LTE using the LTE processing unit 513 and communication based on WiFi using the WiFi control unit 514.

Figure 17:
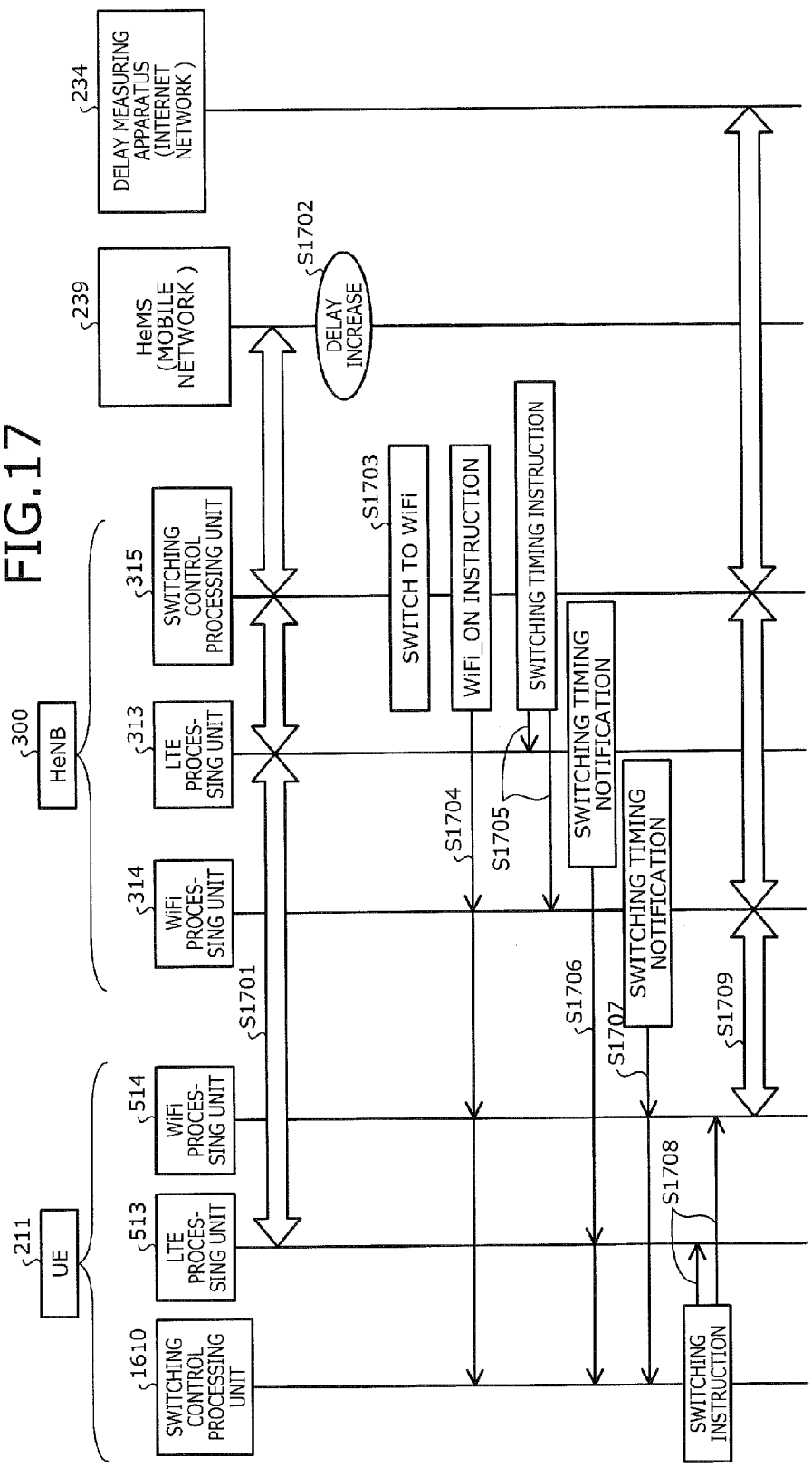
FIG. 17 is a sequence diagram of an example of an operation 3 executed for communication in the communication system.

FIG. 17 is a sequence diagram of an example of an operation 3 executed for communication in the communication system. When the configuration of the UE 500 depicted in FIG. 16 is used, for example, steps depicted in FIG. 17 are executed in the communication system 200. It is assumed that communication is executed between the UE 211 and the HeNB 300 based on LTE (step S1701). The communication based on the LTE executed at step S1701 is same as that executed at step S1412 depicted in FIG. 14A.

It is assumed that the line state of the mobile network 235 changes and the delay in the mobile network 235 increases (step S1702) and that the switching control processing unit 315 of the HeNB 300 determines to switch the communication scheme used by the UE 211 to WiFi in response to the increased delay at step S1702 (step S1703).

The switching control processing unit 315 of the HeNB 300 transmits a WiFi_ON instruction to instruct the start of communication based on WiFi, to the UE 211 through the WiFi processing unit 314 (step S1704). The WiFi_ON instruction transmitted at step S1704 is received by the switching control processing unit 1610 through the WiFi processing unit 514 of the UE 211.

The switching control processing unit 315 of the HeNB 300 outputs to the LTE processing unit 313 and the WiFi processing unit 314, a switching timing instruction instructing the timing of the switch to the communication based on WiFi (step S1705).

The LTE processing unit 313 notifies the UE 211 of the switching timing instructed by the switching timing instruction output at step S1705 (step S1706). The switching timing notified at step S1706 is notified to the switching control processing unit 1610 through the LTE processing unit 513.

The WiFi processing unit 314 notifies the UE 211 of the switching timing instructed by the switching timing instruction output at step S1705 (step S1707). The switching timing notified at step S1707 is notified to the switching control processing unit 1610 through the WiFi processing unit 514.

When the switching timing notified of at steps S1706 and S1707 arrives, the switching control processing unit 1610 outputs to the LTE processing unit 513 and the WiFi processing unit 514, the switching instruction to instruct the switch to the communication based on WiFi (step S1708).

In response, the LTE processing unit 513 disconnects the communication based on LTE and the WiFi processing unit 514 starts communication based on WiFi and thereby, the communication based on WiFi (step S1709) is started between the UE 211 and the HeNB 300. The communication based on WiFi started at step S1709 is same as that at step S1422 depicted in FIG. 14B.

In this manner, the switching control processing unit 1610 receives the switching timing instruction for the communication scheme from the HeNB 300 and notifies the LTE processing unit 513 and the WiFi processing unit 514 of the switching instruction at the timing instructed by the switching timing instruction. Thereby, the switching between LTE and WiFi can be executed during communication, according to the propagation state, the line state, the data amount, etc., which vary from moment to moment. Both the HeNB 300 and the UE 211 can switch the communication scheme at the same timing.

Figure 18:
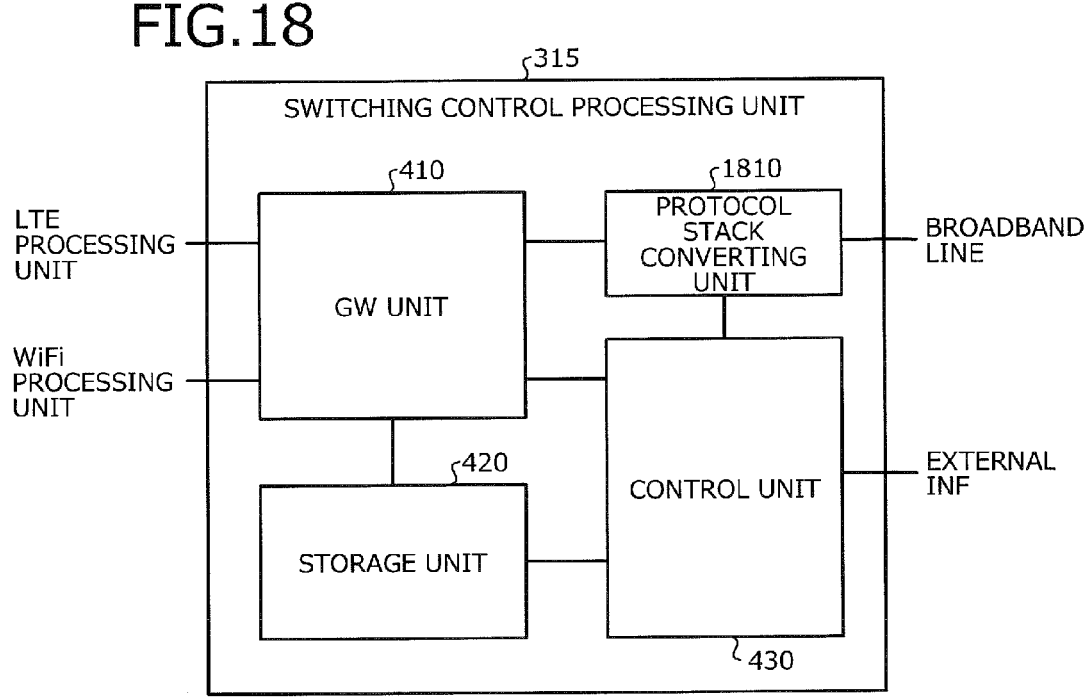
FIG. 18 is a diagram of a variation of the configuration of a switching control processing unit of the HeNB.

FIG. 18 is a diagram of a variation of the configuration of the switching control processing unit of the HeNB. In FIG. 18, parts identical to those depicted in FIG. 4 are given the same reference numerals used in FIG. 4 and will not again be described. As depicted in FIG. 18, the switching control processing unit 315 of the HeNB 300 may include a protocol stack converting unit 1810 in addition to the configuration depicted in FIG. 4.

FIG. 19 is a sequence diagram of an example of an operation 4 executed for communication in the communication system. When the configuration of the switching control processing unit 315 of the HeNB 300 depicted in FIG. 18 is used, for example, steps depicted in FIG. 19 are executed in the communication system 200.

It is assumed that the UE 211 executes communication based on LTE with the Internet network 233 (step S1901). At step S1901, the switching control processing unit 315 of the HeNB 300 receives the downlink data from the Internet network 233 through the mobile network 235 and outputs the received downlink data to the LTE processing unit 313. The LTE processing unit 313 transmits by radio based on LTE, the downlink data output from the switching control processing unit 315 to the UE 211; receives the uplink data transmitted from the UE 211 by radio based on LTE; and outputs the received uplink data to the switching control processing unit 315. The switching control processing unit 315 transmits the uplink data output from the LTE processing unit 313 to the Internet network 233 through the mobile network 235.

It is assumed that the UE 212 executes communication based on LTE with the mobile network 235 (step S1902). The communication executed based on LTE at step S1902 is same as that executed at step S1412 depicted in FIG. 14A.

It is assumed that the line state of the mobile network 235 changes and the delay in the mobile network 235 increases (step S1903) and that the switching control processing unit 315 of the HeNB 300 changes the line for the communication between the UE 211 and the Internet network 233 in response to the increased delay at step S1903 (step S1904). For example, the switching control processing unit 315 relays the communication between the UE 211 and the Internet network 233 while converting the protocol stack (step S1905).

At step S1905, the switching control processing unit 315, without using the mobile network 235, receives the downlink data transmitted based on the WiFi protocol from the Internet network 233; converts the protocol stack of the received downlink data into the LTE protocol stack; and outputs to the LTE processing unit 313, the downlink data whose protocol stack has been converted. The LTE processing unit 313 transmits to the UE 211 by radio based on LTE, the downlink data output from the switching control processing unit 315.

The LTE processing unit 313 receives the uplink data transmitted from the UE 211 by radio based on LTE and outputs the received uplink data to the switching control processing unit 315. The switching control processing unit 315 converts the protocol stack of the uplink data output from the LTE processing unit 313 based on the LTE protocol stack into the WiFi protocol stack; and transmits the uplink data whose protocol stack has been converted, to the Internet network 233 without using the mobile network 235.

Similar to step S1902, the UE 212 continues the communication with the mobile network 235 based on LTE (step S1906).

In this manner, the HeNB 300 relays the communication between the UE 211 and the Internet network 233 while converting the protocol stack and thereby, can switch the transmission route for the data transmitted and received by the UE 211. For example, the UE 211 can switch the line between the UE 211 and the Internet network 233 from the line that passes through the mobile network 235 to a line that does not pass through the mobile network 235, while continuing the communication with the HeNB 300 based on LTE.

As described, according to the base station, the control method, and the communication system, improvement of the communication efficiency can be facilitated.

For example, the service area managed by the HeNB is small and therefore, the radio propagation state tends to be same for the UEs present in the coverage of one HeNB. Therefore, if each UE selects a communication scheme corresponding to the radio propagation state, the UEs may select the same communication scheme and unbalanced use of the communication schemes may occur. Therefore, load concentration occurs due to the unbalanced use of the communication schemes, and deterioration of the radio propagation state may be able to be resolved.

On the contrary, the HeNB 300 selects switching logic according to information such as the network state, the service content, the data amount, and the billing (the contract state) that are values specific to each EU, in addition to the radio propagation state, and selects a communication scheme based on the selected switching logic. Thereby, the communication scheme of the UE under the HeNB can be controlled properly while suppressing unbalanced use of the communication schemes.

For example, compared to a configuration for the HeNB 239, etc., that is a higher-order monitoring apparatus of the HeNB 300 to intensively control the communication scheme, proper control corresponding to the state of each home is enabled by controlling the communication scheme by the HeNB 300, which is capable of determining the state of each home.

According to an aspect of the embodiments, an effect is achieved that improvement of the communication efficiency can be facilitated.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A base station comprising:
   a communicating unit that relays communication between a network and a mobile terminal that is capable of using a plurality of communication schemes that respectively use differing transmission routes to a network;
   a measuring unit that measures a delay amount in the transmission route of each of the communication schemes; and
   a switching unit that among the communication schemes and based on predetermined information that includes the measured delay amount, switches the communication scheme used for relaying the communication, wherein
   the communication schemes include a first communication scheme of connecting to the network through a mobile communication network and a second communication scheme of connecting to the network without using the mobile communication network, and
   the measuring unit measures the delay amount in the transmission route of the first communication scheme by receiving a response signal in response to a measurement signal transmitted to a first apparatus that is connected to the mobile communication network, and measures the delay amount in the transmission route of the second communication scheme by receiving a response signal in response to a measurement signal transmitted, without using the mobile communication network, to a second apparatus that is connected to the network.

2. The base station according to claim 1, wherein the communication schemes include a long term evolution (LTE) scheme of connecting to the network through a mobile communication network and a wireless local area network (WLAN) to connect to the network without using the mobile communication network.

3. The base station according to claim 1, wherein the measuring unit measures the delay amount in the transmission route of each of the communication schemes by transmitting a measurement signal to the transmission route of each of the communication schemes and receiving a response signal in response to the transmitted measurement signal.

4. The base station according to claim 1, wherein the switching unit switches the communication scheme used for relaying the communication, based on the predetermined information that includes information that indicates a data amount transmitted to the network and received from the network by the mobile terminal.

5. The base station according to claim 1, wherein the switching unit switches the communication scheme used for relaying the communication, based on the predetermined information that includes information that indicates a type of data transmitted to the network and received from the network by the mobile terminal.

6. The base station according to claim 1, wherein the switching unit switches the communication scheme used for relaying the communication, based on the predetermined information that is for the communication schemes and that includes information that indicates a use state of each mobile terminal currently connected to the base station.

7. The base station according to claim 1, wherein the switching unit switches the communication scheme used for relaying the communication, based on user-settable correlation information that correlates contents of the predetermined information with any one communication scheme among the communication schemes.

8. The base station according to claim 1, wherein the switching unit preferentially selects information whose priority rank is high among plural types of information, based on user-settable priority rank information that indicates a priority rank of each of the types of information included in the predetermined information, and switches the communication scheme used for relaying the communication based on the selected information.

9. The base station according to claim 1, wherein the switching unit causes the base station not to respond to a request signal that is from the mobile terminal and requests communication based on a given communication scheme among the communication schemes.

10. The base station according to claim 1, wherein the switching unit switches the communication scheme used by the mobile terminal by transmitting to the mobile terminal, a signal instructing switching to a communication scheme selected based on the predetermined information and from among the communication schemes.

11. The base station according to claim 1, wherein the communication schemes include a first communication scheme and a second communication scheme that is different from the first communication scheme, the communicating unit is switchable between:
  a first state in which the communicating unit transmits data received under the first communication scheme and from the mobile terminal, to the network via a transmission route under the first communication scheme, and transmits under the first communication scheme and to the mobile terminal, data received from the network via the transmission route under the first communication scheme; and
  a second state in which the communicating unit converts into a protocol of the second communication scheme, a protocol of data received under the first communication scheme and from the mobile terminal, and transmits the data to the network via a transmission route under the second communication scheme; and converts into a protocol of the first communication scheme, a protocol of data received from the network via the transmission route under the second communication scheme, and under the first communication scheme, transmits the data to the mobile terminal, and
the switching unit switches based on the predetermined information, a state of the communicating unit to be any one among the first state and the second state.

12. The base station according to claim 1, wherein the switching unit switches the communication scheme used for relaying the communication, based on the predetermined information that includes for each of the communication schemes, a result of measurement of a radio propagation state between the mobile terminal and the base station.

13. A control method of a base station that relays communication between a network and a mobile terminal that is capable of using a plurality of communication schemes that respectively use differing transmission routes to a network, the control method comprising:
  measuring a delay amount in the transmission route of each of the communication schemes; and
  switching among the communication schemes and based on predetermined information that includes the measured delay amount, the communication scheme used for relaying the communication, wherein
  the communication schemes include a first communication scheme of connecting to the network through a mobile communication network and a second communication scheme of connecting to the network without using the mobile communication network, and
  the measuring includes measuring the delay amount in the transmission route of the first communication scheme by receiving a response signal in response to a measurement signal transmitted to a first apparatus that is connected to the mobile communication network, and measures the delay amount in the transmission route of the second communication scheme by receiving a response signal in response to a measurement signal transmitted, without using the mobile communication network, to a second apparatus that is connected to the network.

14. A communication system comprising:
a mobile terminal that is capable of using a plurality of communication schemes that respectively use differing transmission routes; and
a base station that relays communication between the mobile terminal and a network, measures a delay amount in the transmission route of each of the communication schemes, and among the communication schemes and based on predetermined information that includes the measured delay amount, switches the communication scheme used for relaying the communication, wherein the communication schemes include a first communication scheme of connecting to the network through a mobile communication network and a second communication scheme of connecting to the network without using the mobile communication network, and the base station measures the delay amount in the transmission route of the first communication scheme by receiving a response signal in response to a measurement signal transmitted to a first apparatus that is connected to the mobile communication network, and measures the delay amount in the transmission route of the second communication scheme by receiving a response signal in response to a measurement signal transmitted, without using the mobile communication network, to a second apparatus that is connected to the network.

* * * * *